United States Patent [19]
Magara

[11] Patent Number: 5,189,276
[45] Date of Patent: Feb. 23, 1993

[54] METHOD AND APPARATUS FOR TREATING THE DIELECTRIC USED IN ELECTRICAL DISCHARGE MACHINING

[75] Inventor: Takuji Magara, Aichi, Japan

[73] Assignee: Mitsubishi Denki K.K., Tokyo, Japan

[21] Appl. No.: 883,615

[22] Filed: Mar. 27, 1992

Related U.S. Application Data

[63] Continuation of Ser. No. 618,444, Nov. 27, 1990, abandoned.

[30] Foreign Application Priority Data

Feb. 13, 1990 [JP] Japan .................................. 2-32152

[51] Int. Cl.⁵ .............................................. B23H 1/10
[52] U.S. Cl. .............................................. 219/69.14
[58] Field of Search .................... 219/69.14; 210/189, 210/712, 713, 745, 768, 793, 797, 798

[56] References Cited

U.S. PATENT DOCUMENTS

| | | | |
|---|---|---|---|
| 4,312,764 | 1/1982 | Parshall | 210/790 |
| 4,375,588 | 3/1983 | Frei | 219/69.14 |
| 4,551,602 | 11/1975 | Inoue et al. | 219/69.14 |
| 4,839,488 | 6/1989 | Katoh et al. | 219/69.14 |
| 4,857,688 | 8/1989 | Aso et al. | 219/69.14 |
| 4,870,243 | 9/1989 | Wilson et al. | 219/69.14 |
| 4,952,768 | 8/1990 | Mohri et al. | 219/69.15 |
| 4,992,641 | 2/1991 | Budin et al. | 219/69.14 |
| 5,013,432 | 5/1991 | Martinez-Mugica | 219/69.14 |

FOREIGN PATENT DOCUMENTS

| | | |
|---|---|---|
| 0286686 | 10/1988 | European Pat. Off. . |
| 2-30423 | 1/1990 | Japan . |
| 8807428 | 10/1988 | PCT Int'l Appl. .............. 219/69.14 |
| 828336 | 2/1960 | United Kingdom . |

OTHER PUBLICATIONS

Patent Abstracts of Japan vol. 10, No. 388 (M-549) (2445) 24 Dec. 86 & JP-A-61 178 121 (Inoue Japax Res Inc) 9 Aug. 1986.
Patent Abstracts of Japan, vol. 13, No. 143 (M-811) (3491) 7 Apr. 1989 & JP-A63 306 823 (Mitsubishi Electric Corp.) 14 Dec. 1988.

*Primary Examiner*—Geoffrey S. Evans
*Attorney, Agent, or Firm*—Sughrue, Mion, Zinn, Macpeak & Seas

[57] ABSTRACT

An electrical discharge machining (EDM) apparatus having one or more dielectric tanks, each having one or more compartments, connected to an EDMing tank by pipes, defining input and output dielectric paths and having selectively placed therein pumps and control valves. The tanks are used for containing dielectric during roughing and finishing operations. Filters are used in the paths for removal of particles suspended in the dielectric. A filter loop with input and output paths containing a bidirectional filter can be used to filter and store finishing powders from a finishing dielectric and to regenerate the finishing dielectric by backwashing the filter with clean dielectric to replace the powder in the dielectric. Various combinations of inputs, discharge and filter paths may be used with various designs of dielectric tanks, having one or more compartments, in order to meet particular operational requirements. The operation of valves and filters in the disclosed invention can occur automatically, in response to the output from various detectors, positioned to identify respective system parameters.

18 Claims, 20 Drawing Sheets

METHOD AND APPARATUS FOR TREATING THE DIELECTRIC USED IN ELECTRICAL DISCHARGE MACHINING

This is a continuation of application No. 07/618,444, now abandoned, filed Nov. 27, 1990.

BACKGROUND OF THE INVENTION (1) Field Of The Invention

The present invention relates to a method and an apparatus for treating the dielectric used in an electrical discharge machine tool (hereinafter referred to as an "EDM") wherein the dielectric is mixed with powder materials.

(2) Description Of The Background Art

In the EDMing arts, it is well known to perform melt processing or heat treatment on a workpiece made of an electrically conductive material, e.g., metal, by utilizing the high-temperature energy generated in an electrical discharge path. The discharge gap is filled with dielectric having electrical insulation characteristics to obtain the electrical insulation required for discharge. Usually an oil or oil/water mixture is used as the dielectric. Besides obtaining electrical insulation, the dielectric functions to remove chips produced during the machining process and to remove the resultant heat from the machining site, thereby acting as an important factor in maintaining stable EDMing.

Japanese patent application No. 1990-15813, which is owned by the assignee of the present patent application, teaches that mixing the dielectric with certain kinds of materials in the form of powders of approximately 10 to 40 μm in particle diameter, to a mixing density of around 20 g/liter, improves the stability of discharge. Depending on the material, the powder dielectric acts to upgrade mechanical characteristics, e.g., corrosion resistance and wear resistance, of the EDM electrode and the workpiece surface. In addition to the removal of material (e.g., metal) from the workpiece, EDMing allows the metal to be surface-treated. The powder materials used include semiconductor materials, e.g., silicon (Si), zinc oxide (ZnO), zinc dioxide ($ZnO_2$), silicon dioxide ($SiO_2$), tungsten carbide (WC) and zirconium boride ($ZrB_2$), and fine ceramic materials, i.e., carbide and boride.

It has been proposed to machine a workpiece or form a surface layer thereon by mixing such materials in powder form into the dielectric. This proposal would vastly expand the application range of EDM. The problem is to provide for practical implementation of the proposal. Specifically, one goal is to design an apparatus for efficiently treating the dielectric used in EDMing.

One dielectric treating apparatus for an EDM according to the background art is seen in FIG. 23. There an electrode 1 and a workpiece 2 are submerged in a dielectric within an EDMing tank 3. A dielectric tank 4 is connected to tank 3 and receives the dielectric drained from the bottom of tank 3 via valve 10. The drained dielectric may contain roughing chips 5 generated during roughing EDM operations, finishing chips 6 generated during finishing EDM operations and a powdered semiconductor material 7, such as silicon, as mentioned above. A tank 8 contains dielectric, supplied from tank 4 via pump 14 and filter 12, and receives raw powder from powder material supplier 9. A pump 13 operates to supply dielectric from dielectric tank 4 via filter 11 to the EDMing tank 3. The filters 11 and 12 are operative to remove chips from the dielectric pumped by pumps 13 and 14, respectively. The suspended powder is removed as well. A pump 15 supplies dielectric from the tank 8 to a discharge gap between the workpiece 2 and electrode 1 in tank 3.

Operation of the EDM as above constructed can be understood with reference to FIG. 23. In an ordinary roughing process, the workpiece 2 installed in the EDMing tank 3 is EDMed by electrical discharges in a discharge gap formed between the electrode 1 and the workpiece 2. In this process, chips 5 will be produced which will be suspended in the dielectric in the dielectric tank 4. The chips 5 so formed during the machining process will be carried to tank 4 via valve 10 when the dielectric is recirculated. The chip and dielectric suspension is then pumped by pump 13 to filter 11 wherein the chips and any powders are removed and the reclaimed dielectric is circulated back into the EDMing tank 3. When surface treatment, and the like, is to be carried out by finishing machining after roughing, clean dielectric mixed with the powder materials 7 from supplier 9 in tank 8 is pumped by the pump 15 from the tank 8 to the discharge gap formed by the electrode 1 and the workpiece 2. At the same time, dielectric in tank 4, having a suspension of chips and powder materials 7, is pumped from the dielectric tank 4 into the tank 8 via filter 12, in order to remove any chips and powder. The powder materials 7 consumed by EDMing and filtering are replaced by powder from the powder material supplier 9, which is operated to automatically supply the powder materials 7 to the tank 8.

As mentioned above, the powder materials and the chips are treated together in the prior art EDM which does not consider the separation of the chips from the powder materials. In addition, when finishing is performed, especially when accompanied by surface treatment, after a roughing step which produces numerous chips, finishing accuracy is greatly influenced by the numerous chips contained in the finishing dielectric. It is therefore necessary to continuously filter out the chips in the prior art. Finally, since the powder materials are removed from the dielectric with the chips by the filtering process and then discarded, a large quantity of powder materials is consumed, which results in cost disadvantages.

It is, accordingly, an object of the present invention to overcome the disadvantages in the prior art by providing a dielectric treatment apparatus for an EDM, which reduces the consumption of powder materials and allows the same powder materials to be reused over a long period of time.

It is another object of the present invention to filter and store powder materials for reuse with a simple apparatus.

It is a further object of the present invention to automatically detect the deterioration of the powder materials and replace such materials in response to such detection.

SUMMARY OF THE INVENTION

These and other objects of the present invention are accomplished in several embodiments in which one or more dielectric tanks, each having one or more compartments, are connected to an EDMing tank by pipes, defining input and output dielectric paths and having selectively placed therein pumps and control valves. Filters also may be added for removal of particles suspended in the dielectric.

In one embodiment, a roughing tank and a finishing tank are used for containing dielectric during respective roughing and finishing operations. The roughing tank may have plural compartments for storing dielectric from the EDMing tank. The waste particles in the dielectric may be filtered before being discharged into the roughing tank or may be directed to a first compartment in the roughing tank for storage prior to filtering and storage in a second compartment. A separate tank for storing dielectric used during finishing operations may be preferred in order to minimize chip contamination. The dielectric in the tank may be filtered to remove contaminants and deteriorated finishing powders. The roughing and finishing tanks may be combined into a single tank having plural compartments.

A single tank, having a single compartment is used in a further embodiment. During a roughing operation, filtering of contaminants suspended in the discharge from the EDMing tank occurs prior to storage of the dielectric in the tank. A filter loop with input and output paths containing a bidirectional filter also can be used to filter powders that are in the stored dielectric. During a finishing operation, the EDMing tank is discharged directly into the single tank. At the end of the finishing operation, the powder may be removed by the bidirectional filter and stored therein while the dielectric is reused for the roughing operation. The subsequent finishing operation is conducted by backwashing the filter with clean dielectric to wash the powder back into the dielectric.

A filter may be selectively connected into the dielectric supply path between the dielectric tank and the EDMing tank and used to remove contaminants.

Various combinations of inputs, discharge and filter paths may be used with various designs of dielectric tanks, having one or more compartments, in order to meet particular operational requirements.

The operation of valves and filters in the disclosed invention can occur automatically, in response to the output from various detectors, positioned to identify respective system parameters.

DESCRIPTION OF THE PREFERRED EMBODIMENTS

Figure 1:
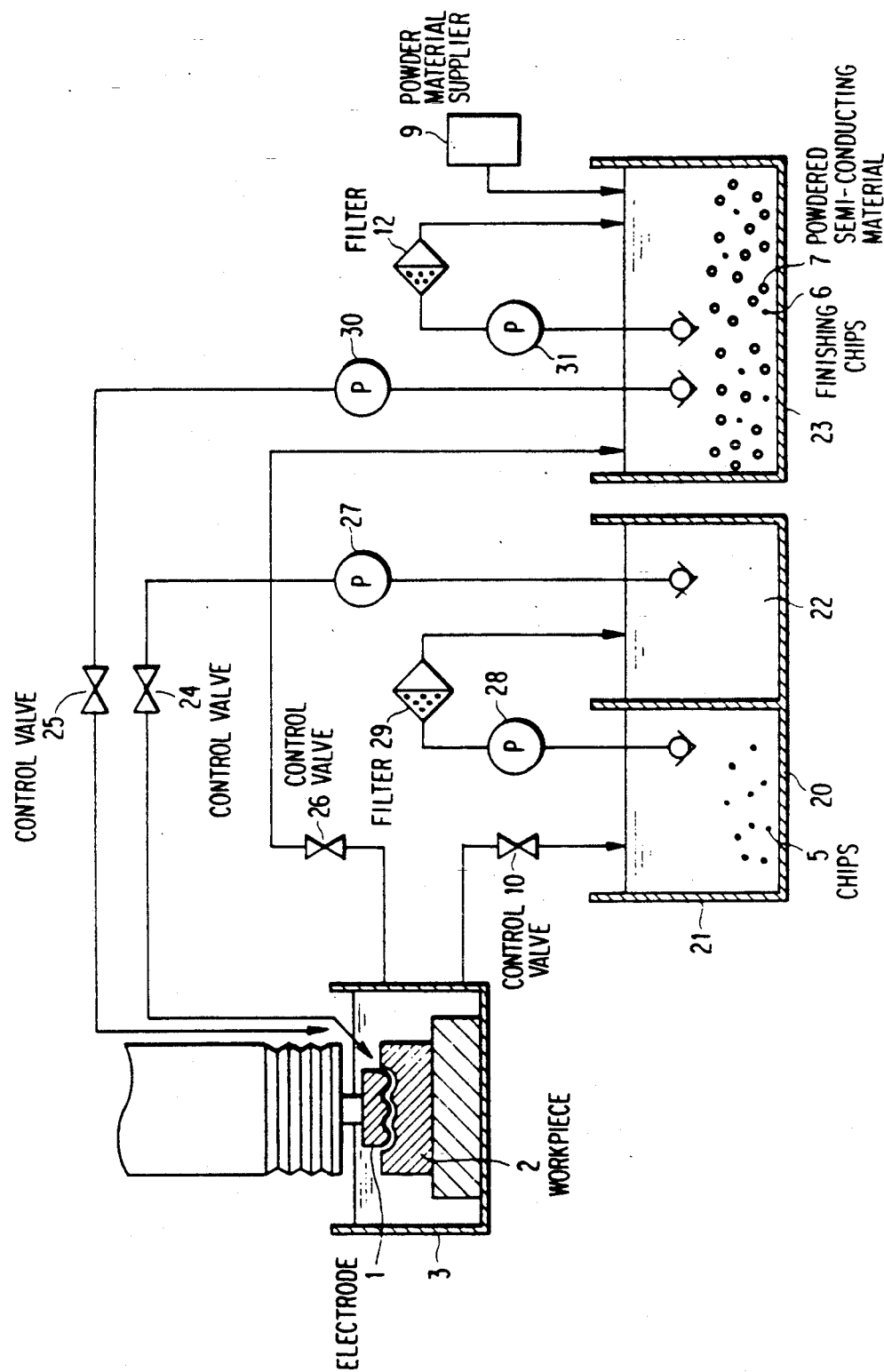
FIG. 1 illustrates a configuration of a dielectric treating apparatus for an EDM according to a first embodiment of the present invention.
Figure 2:
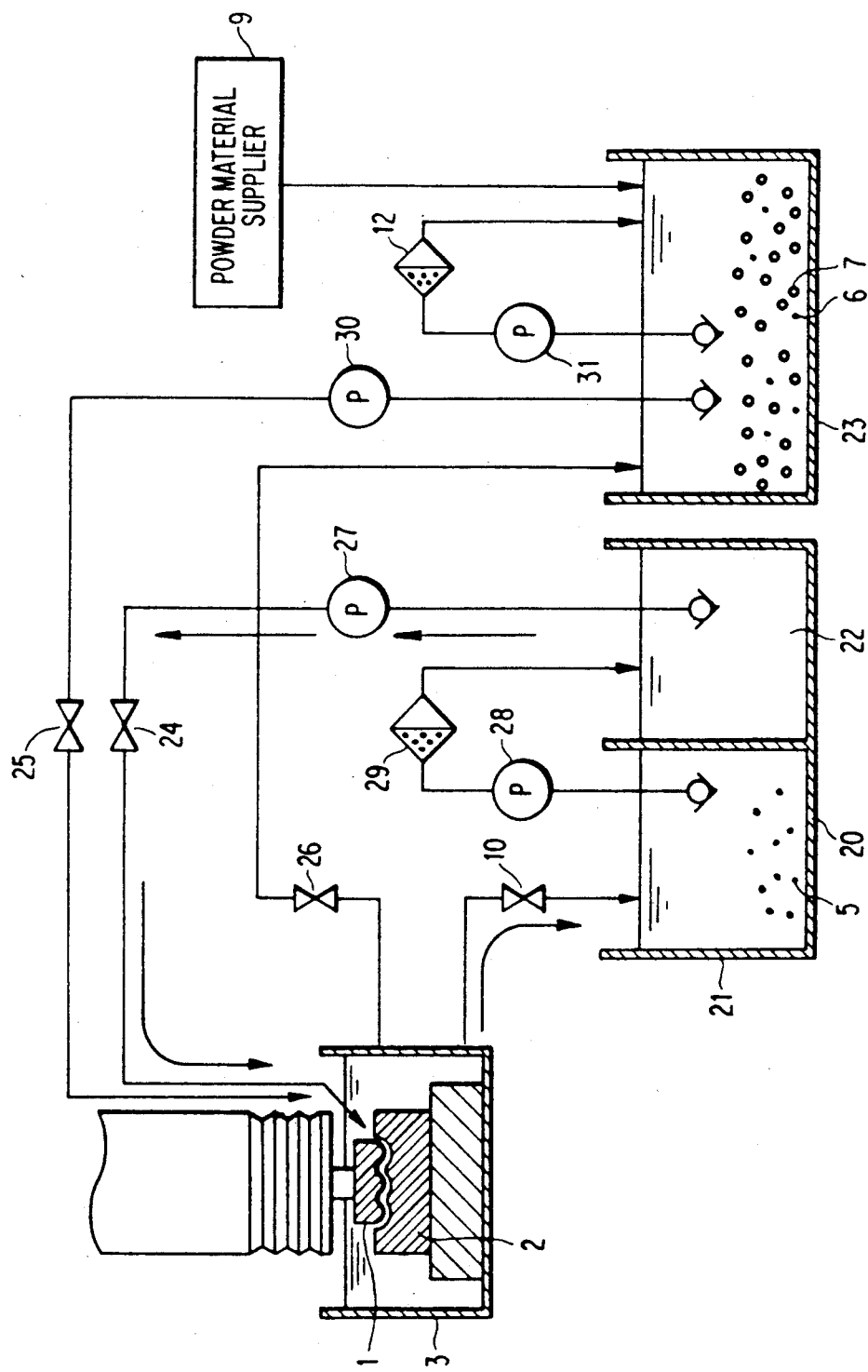
FIGS. 2 to 4 illustrate a configuration of a dielectric treating apparatus shown in FIG. 1.
Figure 3:
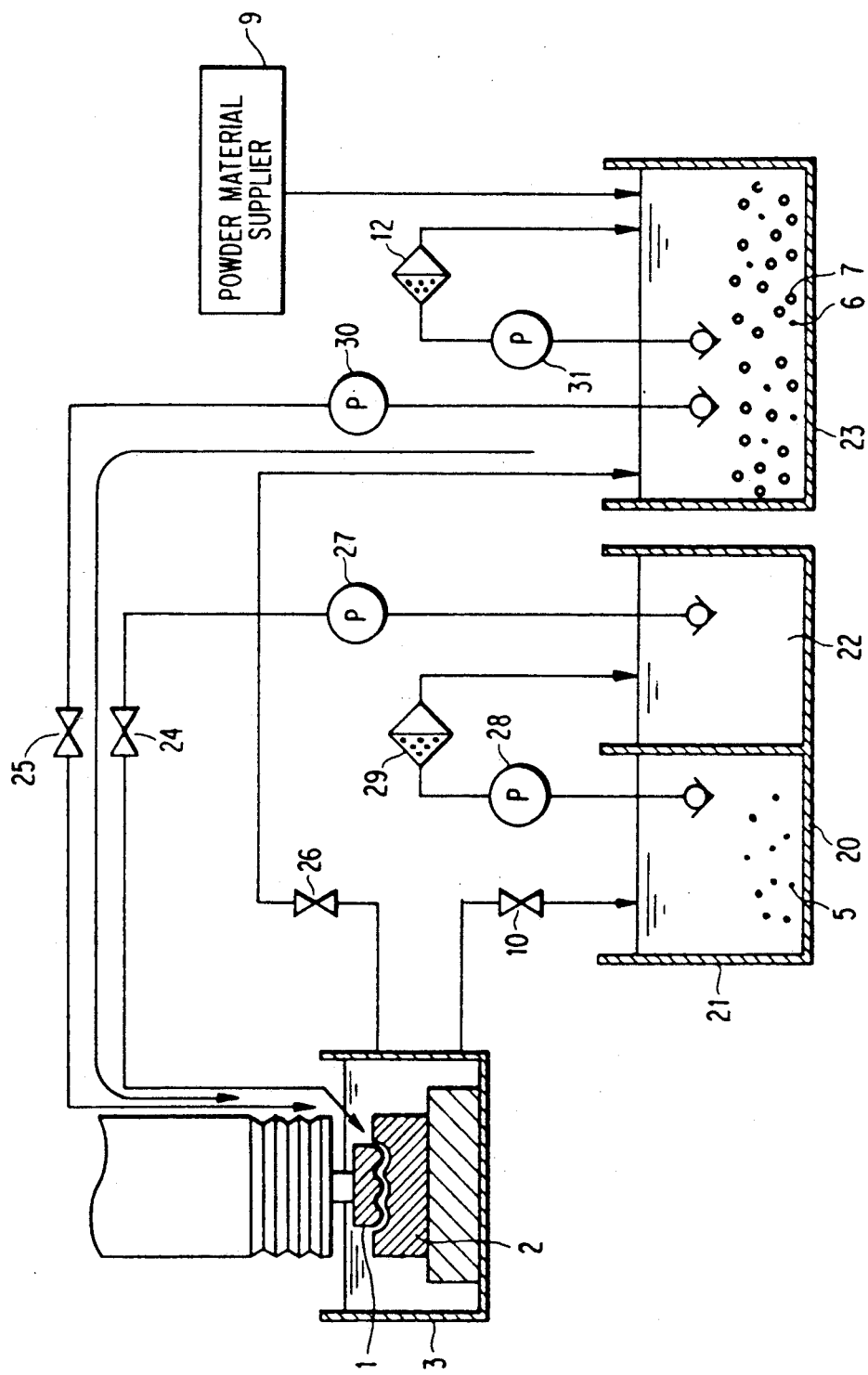
Figure 4:
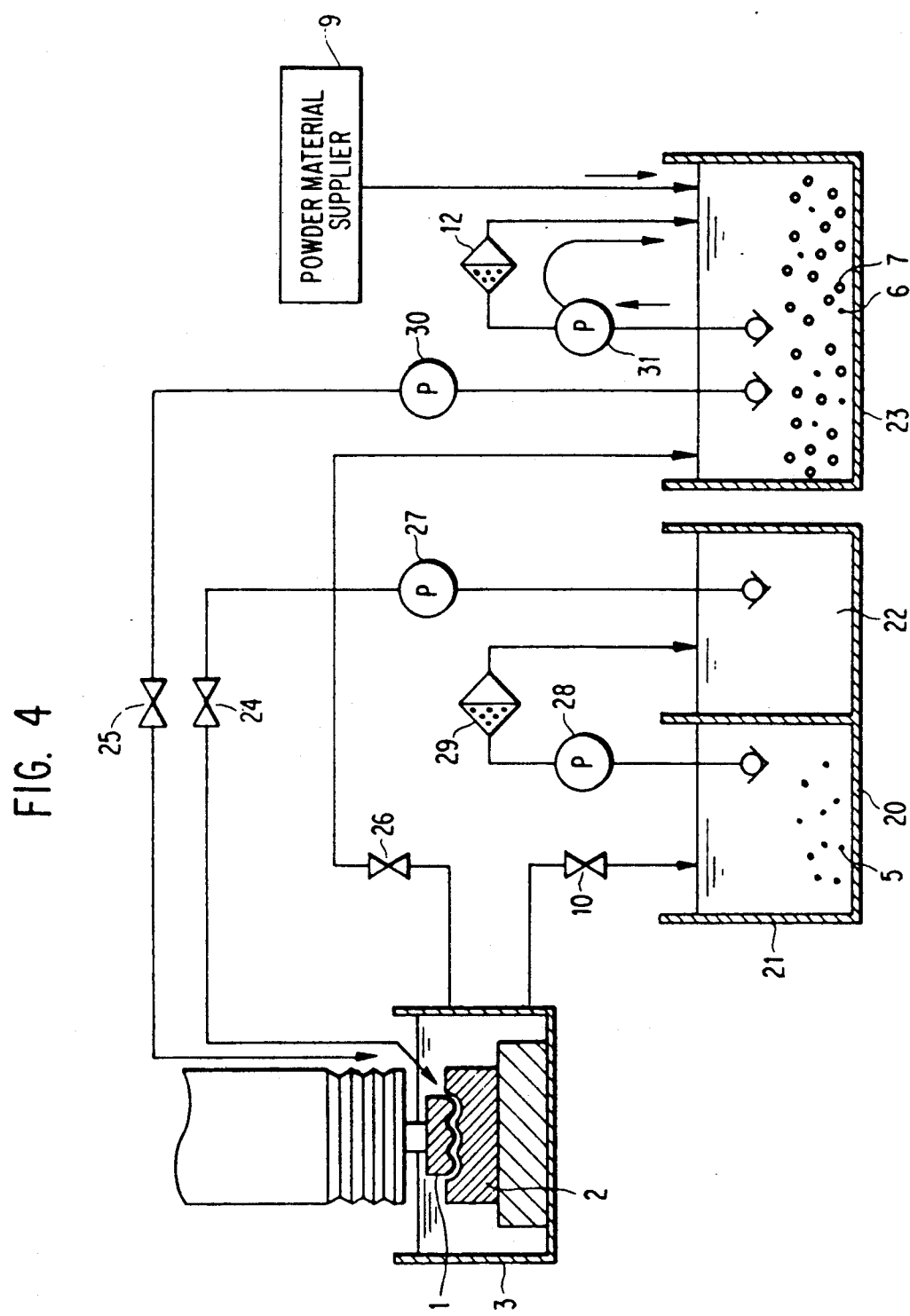
Figure 23:
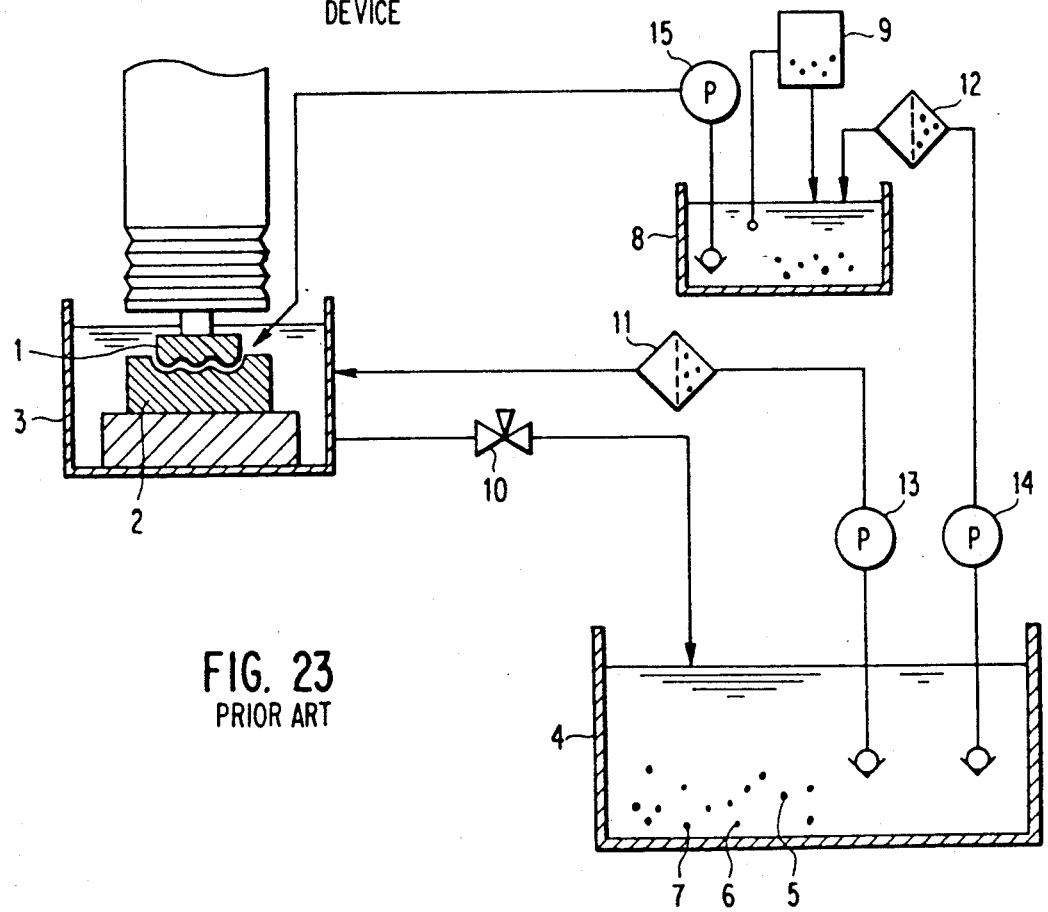
FIG. 23 illustrates a configuration of an EDM equipped with a conventional dielectric treating apparatus.

FIG. 1 illustrates the configuration of a dielectric treating apparatus for an EDM according to a first embodiment of the present invention. FIGS. 2 to 4 illustrate operations of the apparatus shown in FIG. 1. Parts in these drawings identical to or corresponding to those of the conventional apparatus in FIG. 23 are designated by identical reference characters and the explanation of their operation will not be repeated.

In FIG. 1, several dielectric containers are used, including a roughing dielectric tank 20 having a dirty dielectric compartment 21 for containing dirty dielectric recovered from the EDMing tank 3 and a clean dielectric compartment 22 for containing clean dielectric obtained by filtering the dirty dielectric in the dirty dielectric compartment 21, and a finishing dielectric tank 23. Several control valves 10 and 24–26 are used in the apparatus, control valves 10 and 26 being employed in drains used during roughing and finishing operations, respectively. The roughing and finishing drains from the EDMing tank 3 recover the dielectric and direct it into the tanks 20 and 23, respectively. A pump 27 is provided for the roughing dielectric tank 20 and connects the clean dielectric compartment 22 of tank 20 to the EDMing tank 3 via the control valve 24. A pump 28 is used to draw dielectric having a suspension of roughing chips from the dirty dielectric compartment 21 and provide the dielectric to the clean dielectric compartment 22 via a filter 29.

A pump 30 is provided for the finishing dielectric tank 23 and connects the tank 23 to the EDMing tank 3 via the control valve 25. A pump 31 is employed for batch treatment of the dielectric in the finishing dielectric tank 23 so as to remove the powder materials and chips in the finishing dielectric tank 23 via the filter 12.

Operation of the first embodiment of the present invention will now be described with reference to the drawings. FIG. 2 illustrates a sequence of the dielectric flow during roughing. The dielectric in the clean dielectric compartment 22 of the roughing dielectric tank 20 is drawn by the pump 27 and introduced into the EDMing tank 3. The dielectric in the EDMing tank 3 becomes dirty due to chips formed during the roughing operations and is returned into the dirty dielectric compartment 21 of the roughing dielectric tank 20 by the control valve 10. The dielectric with roughing chips 5 is drawn by the pump 28 to the filter 29 and, as a result, clean dielectric is supplied for storage in the clean dielectric compartment 22. The roughing chips 5 are filtered during roughing continually or intermittently so that the clean dielectric free of the roughing chips 5 is always supplied to the EDMing tank 3 during a roughing operation.

The sequence of the dielectric flow during finishing will now be described according to FIG. 3. The finishing dielectric used as the dielectric in the finishing dielectric tank 23 is selected to have excellent finishing characteristics, particularly when mixed with the powder materials 7 by an operator or by the powder material supplier 9. This dielectric is drawn from tank 23 by the pump 30 and is supplied to the EDMing tank 3 and the discharge gap. The dielectric used for finishing is recovered from the EDMing tank 3 to the finishing dielectric tank 23 through the drain control valve 26.

Generally, the powder materials 7 thus mixed in the dielectric are used repeatedly for EDMing. However, if EDMing is repeated for a long period of time, the chips 6 in the dielectric increase in number and the powder materials deteriorate, leading to degraded EDMing characteristics. To prevent this, the pump 31 is operated periodically during ordinary finishing as shown in FIG. 4 to filter out the degraded powder materials 7 and the chips 6 for removal. This removal, however, need be carried out only every several hundred hours on a batch treatment basis because the powder materials 7 have a relatively long life and only a small amount of chips 6 are generated during finishing. After being cleared of the powder materials 7, the clean dielectric accumulated in the finishing dielectric tank 23 is supplied with new powder materials 7 by the operator or the powder material supplier 9 for use as new finishing dielectric.

Figure 5:
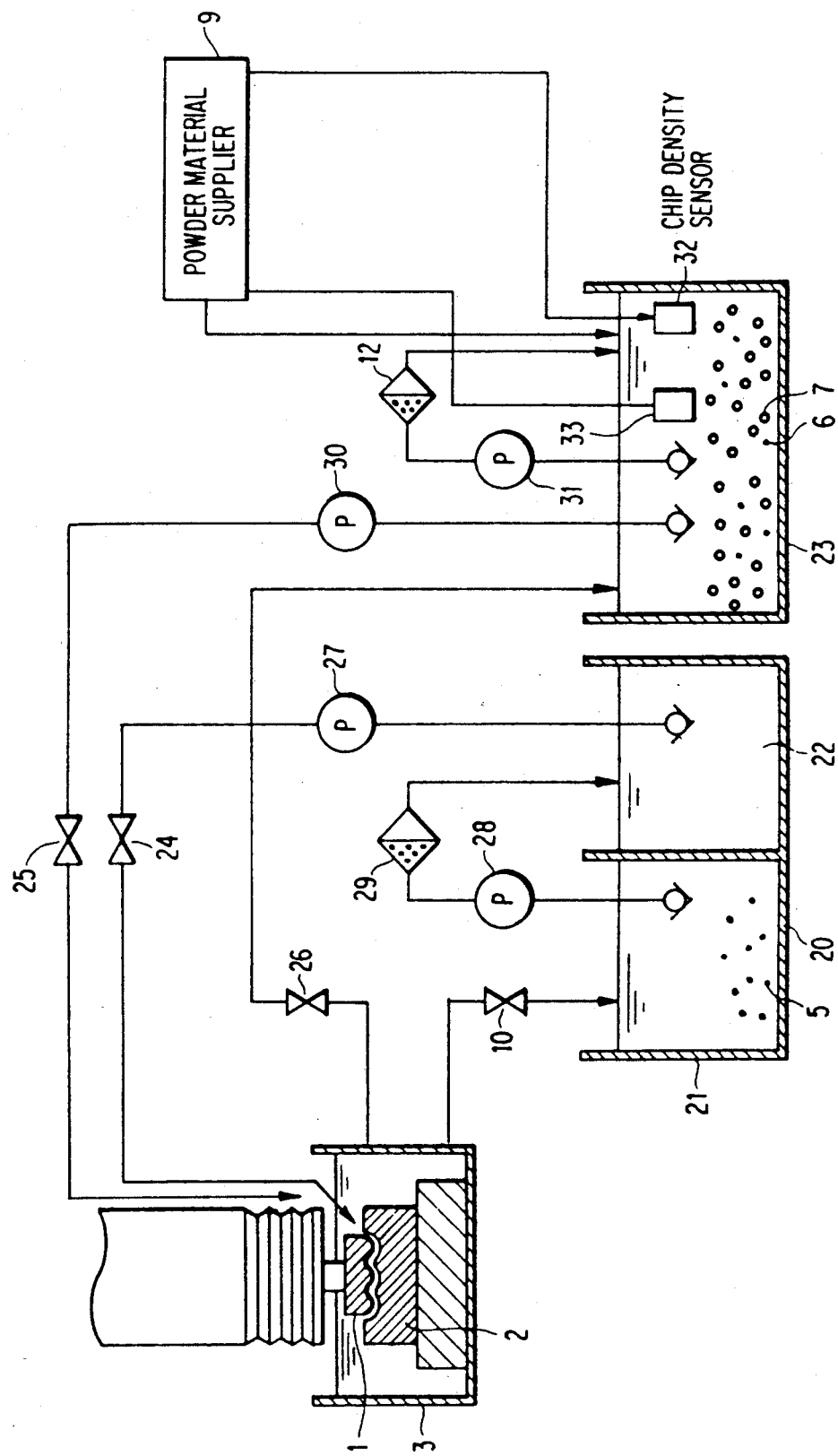
FIG. 5 illustrates a configuration of a dielectric treating apparatus according to a second embodiment of the present invention.

FIG. 5 illustrates a configuration of a second embodiment of the present invention which is provided with a chip density sensor 32 in the finishing dielectric container, e.g., tank 23, so as to automatically remove the chips 6 and change the powder materials 7. The second embodiment allows the powder materials 7 to be batch-changed automatically in accordance with the EDMing amount. In addition, since the degree of deterioration of the powder materials 7 is inversely related to particle diameter of the powders (the particle size decreases with use), the finishing dielectric tank 23 may be provided with a powder particle diameter sensor, or a particle size distribution measuring device 33 for optically measuring the number of powder particles contained per unit volume, or the like, to automatically control filtering and/or addition of the powder materials 7.

Figure 6:
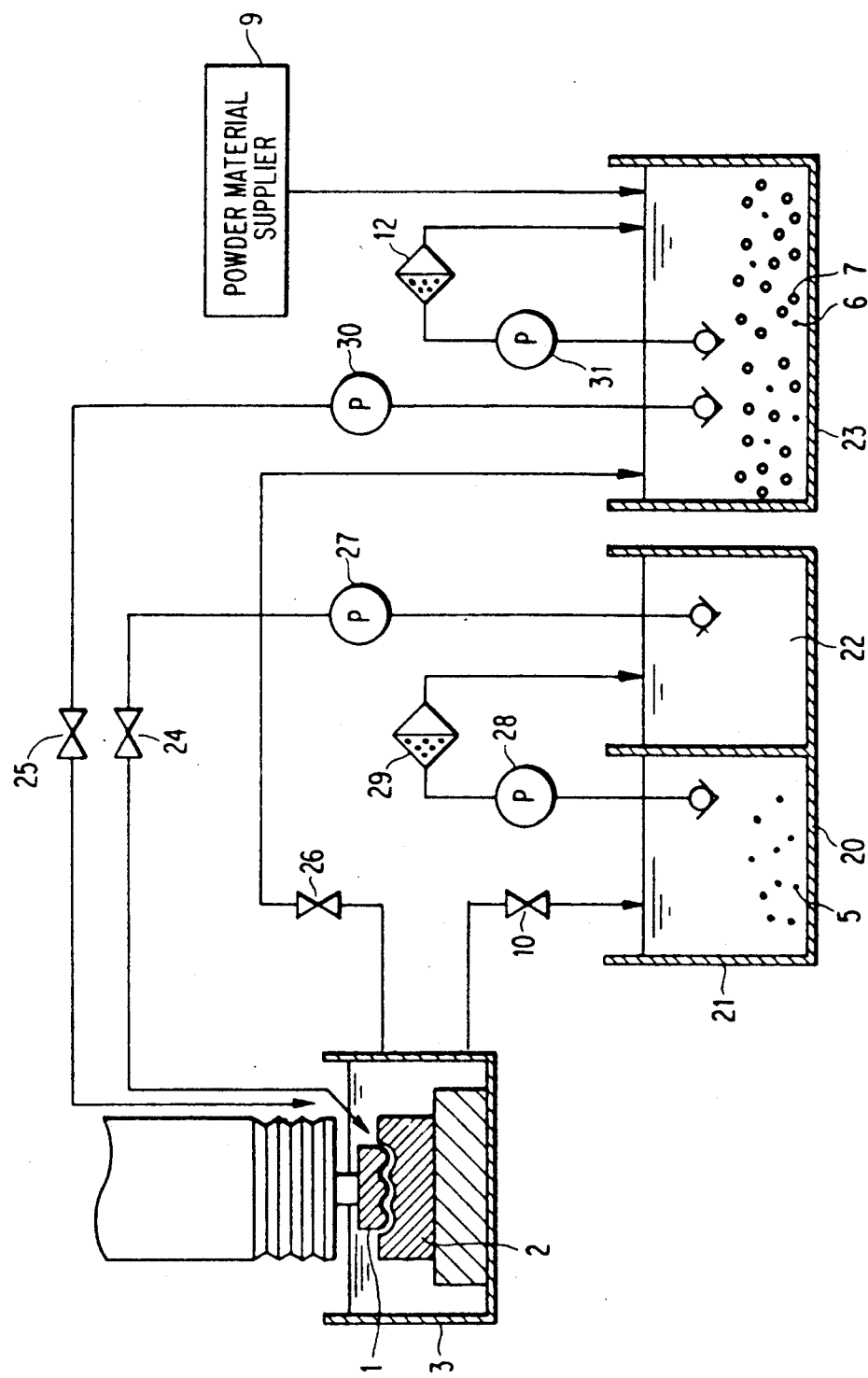
FIG. 6 illustrates a configuration of a dielectric treating apparatus according to a third embodiment of the present invention.

While the roughing dielectric tank 20 and the finishing dielectric tank 23 are provided separately in each of the first and the second embodiments, the same effect may be produced by providing one dielectric container having a plurality of compartments, instead of two dielectric containers. FIG. 6 illustrates a configuration of a third embodiment of the present invention, using a single tank but providing several compartments so that the roughing and finishing dielectrics are not mixed with each other.

Figure 7:
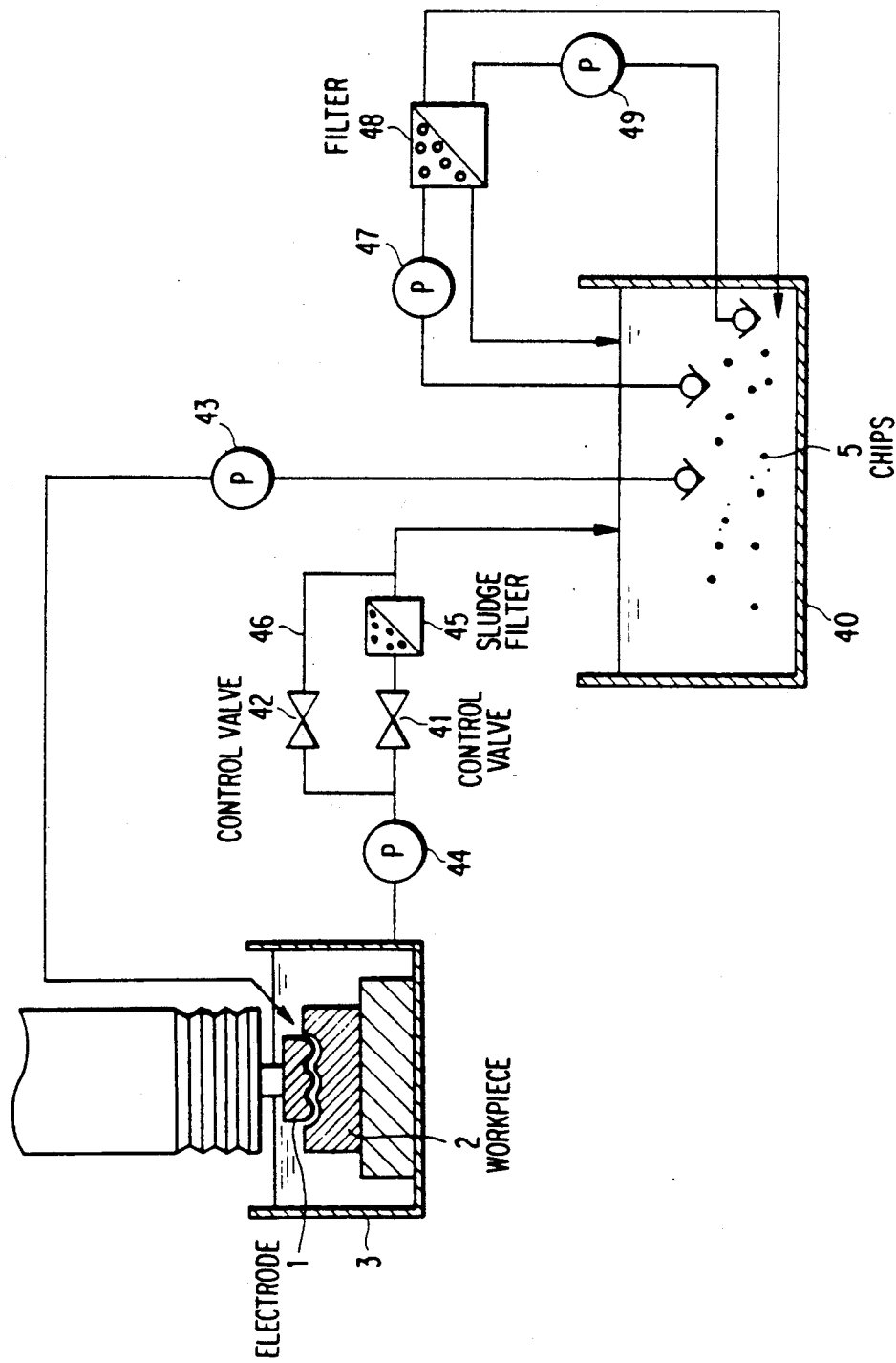
FIG. 7 illustrates a configuration of a dielectric treating apparatus according to a fourth embodiment of the present invention.
Figure 8:
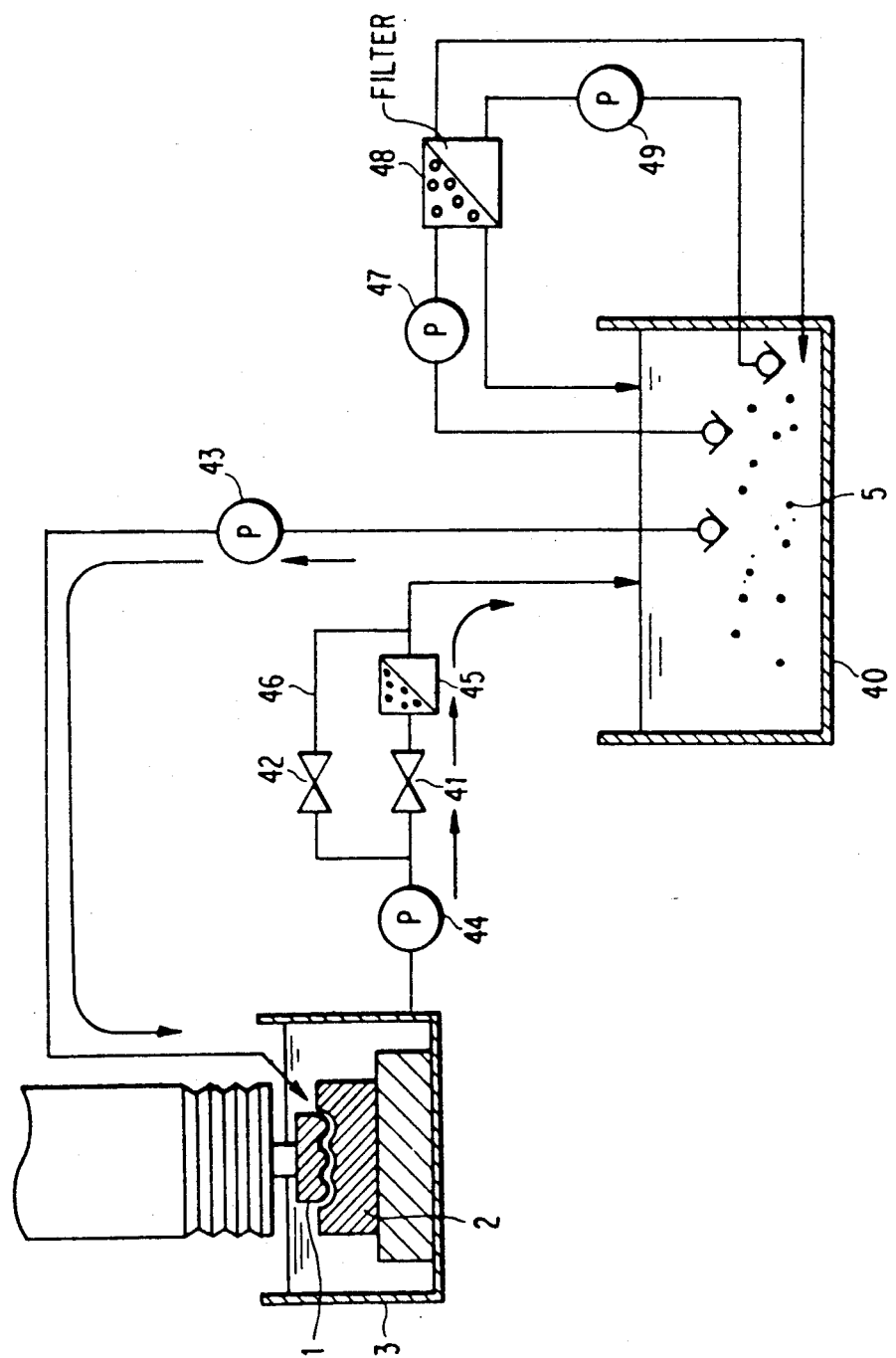
FIGS. 8 to 10 illustrate operations of the dielectric treating apparatus according to a fifth embodiment of the present invention.
Figure 9:
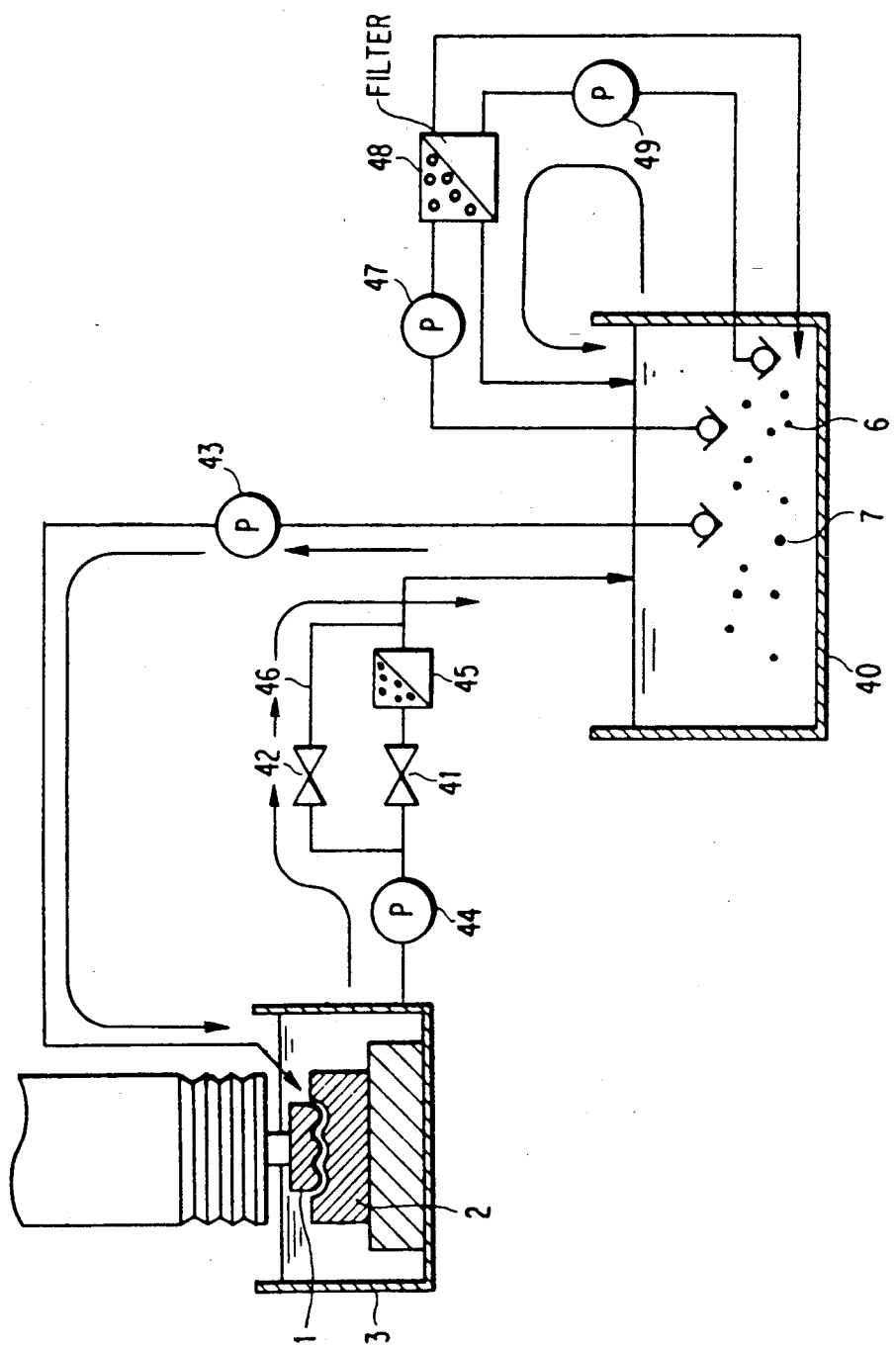
Figure 10:
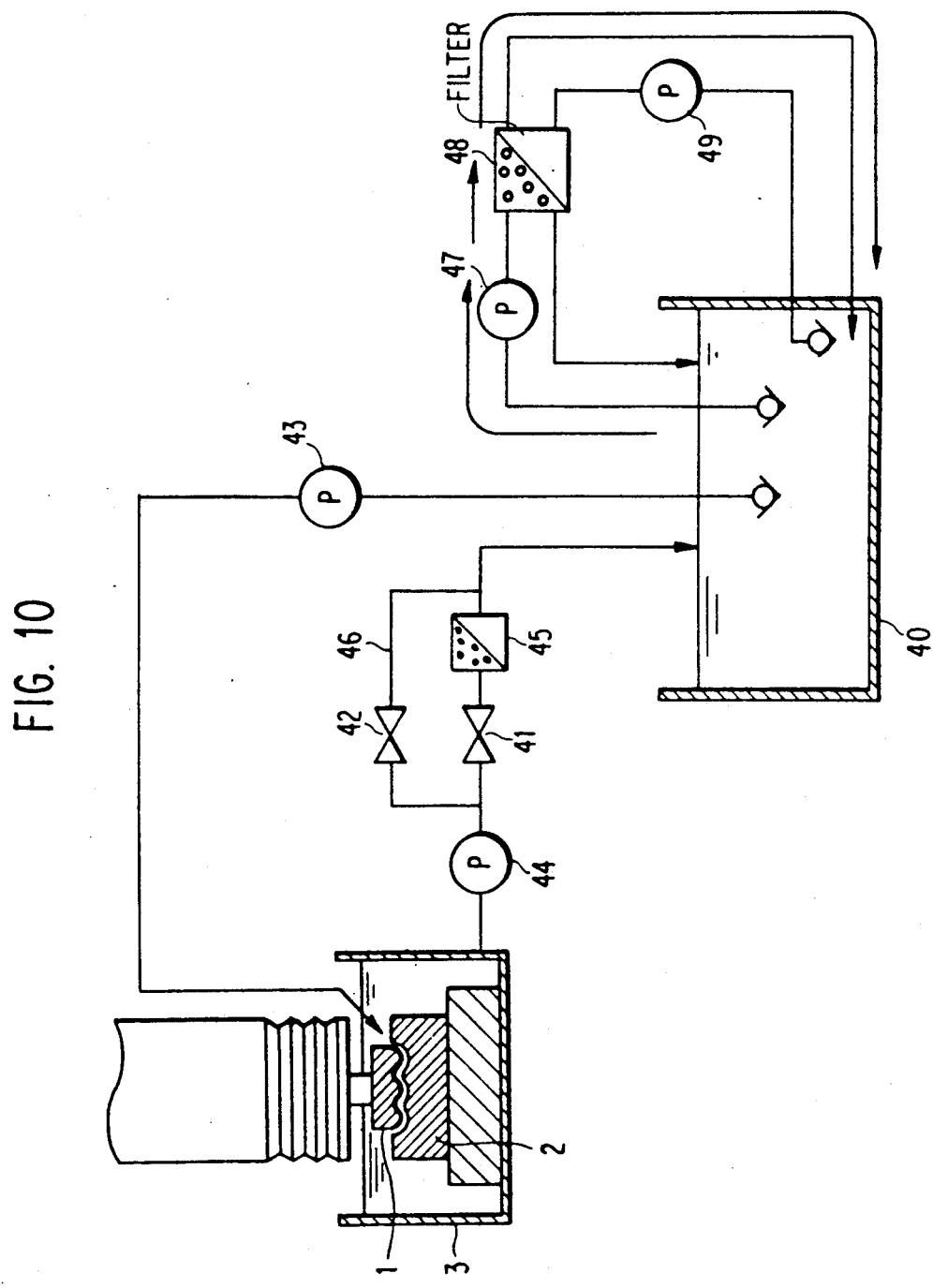

FIG. 7 illustrates the configuration of a fourth embodiment of the present invention, and FIGS. 8 to 10 illustrate operation of the embodiment in FIG. 7. The parts in these drawings identical or corresponding to those of the art in FIG. 23 are specified by identical reference characters and an explanation thereof will not be repeated.

In FIGS. 7-10, a single dielectric container, e.g., a tank, is connected to receive dielectric drained from EDMing tank 3 A pump 44 is employed for the drained dielectric and is connected in the drainage path from tank 3 to the dielectric tank 40 via the sludge filter 45 and the drained dielectric bypass 46. Control valves 41 and 42 are employed in the drainage path during roughing and finishing, respectively. The two valves are used to recovered into the dielectric tank 40 to the EDMing tank 3. During a roughing operation, valve 42 is closed and valve 41 is open, thereby directing the dielectric to filter 45 where it is cleaned of debris and released to tank 40. A pump 43 is provided to direct dielectric in the dielectric tank 40 to the EDMing tank 3.

During a finishing operation, pump 44 directs dielectric via open valve 42 into tank 40 from which it is pumped by pump 43 back into tank 3. Pump 47 may be used to draw dielectric from tank 40 to bidirectional filter 48. Filter 48 can remove powder materials when they are present in the finishing dielectric tank.

Further, a pump 49 is employed to draw dielectric from tank 40 and backwash the powder materials 7 collected in filter 48. This process will mix the powder materials 7 collected in the filter 48 into the dielectric in the dielectric tank 40 by flowing the dielectric in a direction opposite to that of the pump 47.

Operation of the fourth embodiment will now be described in reference to the drawings. FIG. 8 illustrates the sequence of the dielectric flow during roughing. The dielectric in the dielectric tank 40 is drawn by the pump 43 and directed into the EDMing tank 3. The dielectric in the EDMing tank 3 is discharged by the drain pump 44, delivered via the drain control valve 41 to the filter 45, where it is cleared of the roughing chips 5, and recovered into the dielectric tank 40. The roughing chips 5 are filtered off during roughing either at all times or intermittently so that the drained dielectric is always recovered into the dielectric tank 40 after it has been cleaned of the roughing chips 5. As a result, clean dielectric free of the roughing chips 5 is always supplied to the EDMing tank 3 and used for roughing.

A sequence of the dielectric flow during finishing will now be described according to FIG. 9. Prior to the finishing operation, the pump 49 is operated to backwash the filter 48 and mix the powder materials 7 accumulated in the filter 48 into the dielectric tank 40. Once the dielectric is fully mixed with the powder materials 7 it is drawn by the pump 43 and supplied to the EDMing tank 3 and the discharge gap. The dielectric used for finishing is recovered from the EDMing tank 3 to the dielectric tank 40 via the drain control valve 42 through the drained dielectric bypass 46. Valve 41 is closed at this time. Accordingly, the drained dielectric during finishing is recovered into the dielectric tank 40 without being filtered, but this poses no practical problem because the amount of chips generated during finishing is extremely small.

After finishing, the pump 47 is operated as shown in FIG. 10 to pass the dielectric having the powder materials 7 and the small quantity of chips 6 in the dielectric tank 40 through the filter 48, thereby cleaning the dielectric in the dielectric tank 40. Particularly, the powder 7 is stored in the filter 48 until the next finishing operation.

Generally, the powder materials 7 mixed in the dielectric as described above are used repeatedly for EDMing. However, if EDMing is repeated for a long period of time, the chips in the dielectric increase in number and the powder materials are deteriorated, resulting in degraded EDMing characteristics. To prevent this, the powder materials 7 must be changed periodically during ordinary finishing. However, since the powder materials 7 have a relatively long life and only a small amount of chips 6 are generated during finishing, the filter 48 only may be changed and a predetermined amount of new powder materials 7 supplied every several hundred hours.

Figure 11:
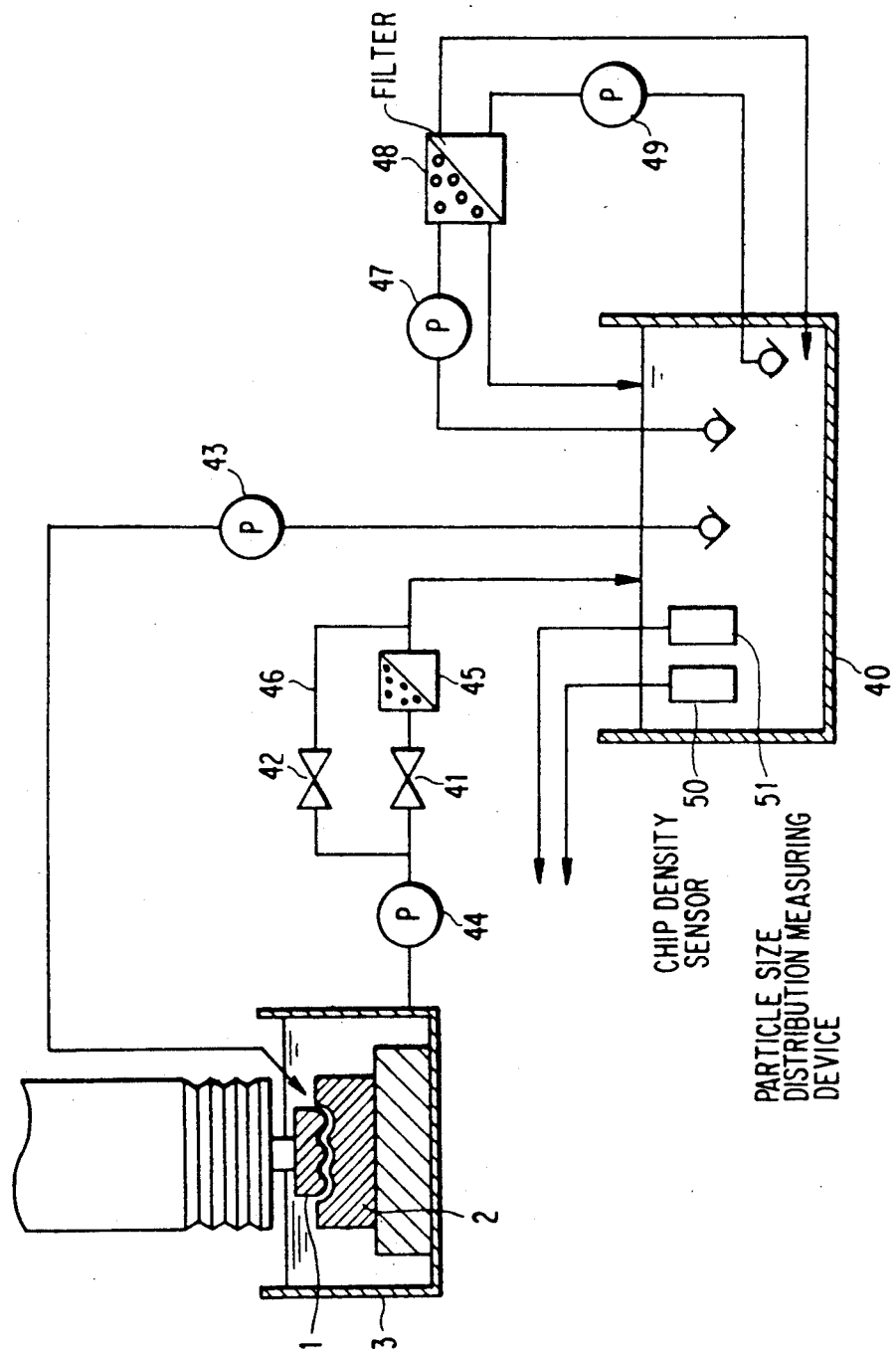
FIG. 11 illustrates a configuration of a dielectric treating apparatus according to the fifth embodiment of the present invention.

FIG. 11 illustrates a configuration of a fifth embodiment of the present invention which is provided with a chip density sensor 50 in the dielectric container, e.g., tank 40, so as to identify when the chips 6 must be removed and the powder materials 7 changed.

Since the degree with which the powder materials 7 have deteriorated is indicated by the particle diameter of the powders, a powder particle diameter sensor, a particle size distribution measuring device 51 for optically measuring the number of particles contained per unit volume, or the like, may be installed in the dielectric tank 40 to detect and identify when the powder materials have passed a threshold of deterioration, as determined by particle size.

Figure 12:
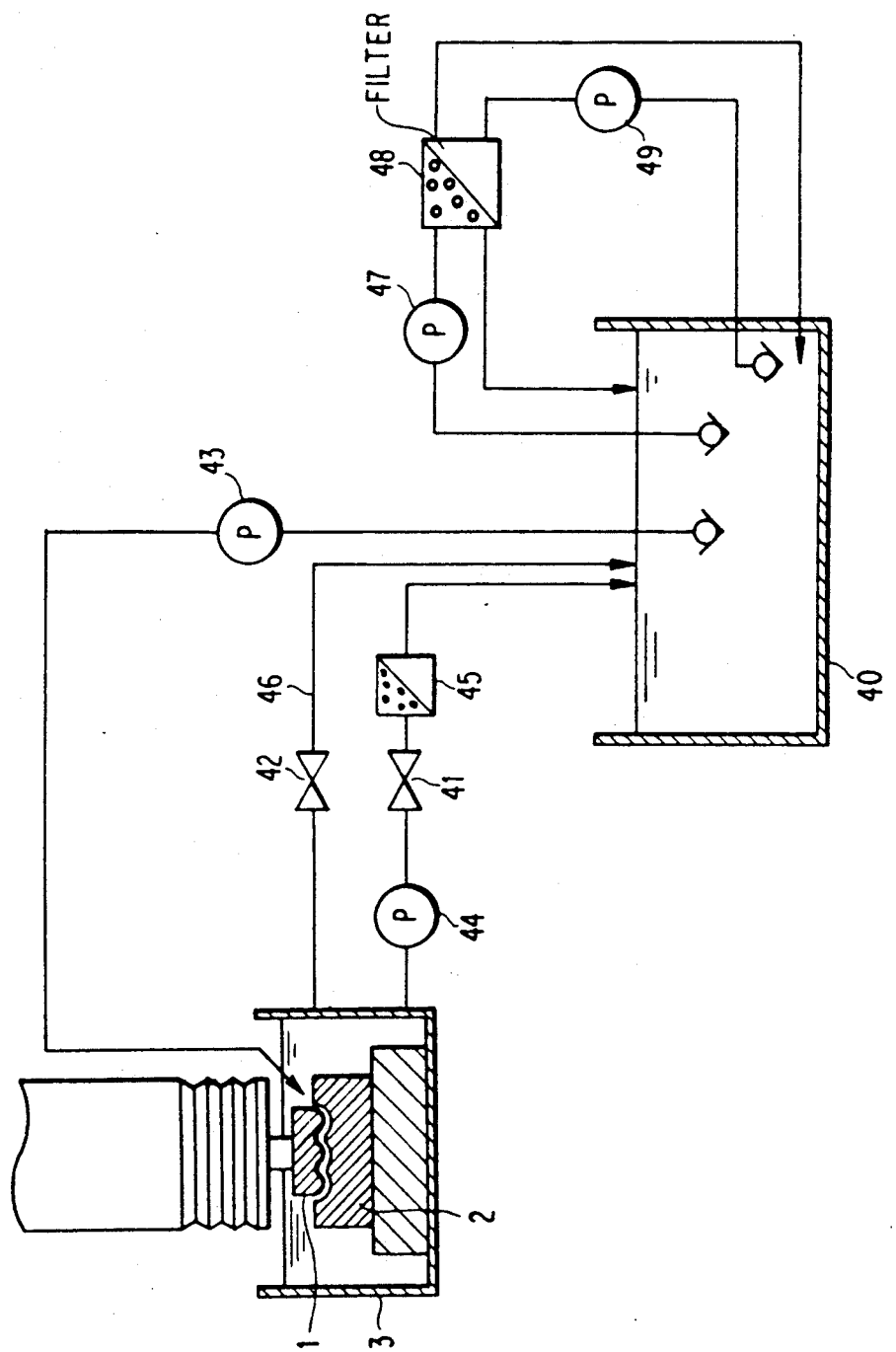
FIG. 12 illustrates a configuration of a dielectric treating apparatus according to a sixth embodiment of the present invention.

While the drained dielectric bypass 46 is installed in series with the pump 44 in the fifth embodiment, it may be installed in parallel with the drained dielectric line without connecting the drained dielectric pump 44, as shown in FIG. 12, which illustrates a configuration of a sixth embodiment of the present invention.

Figure 13:
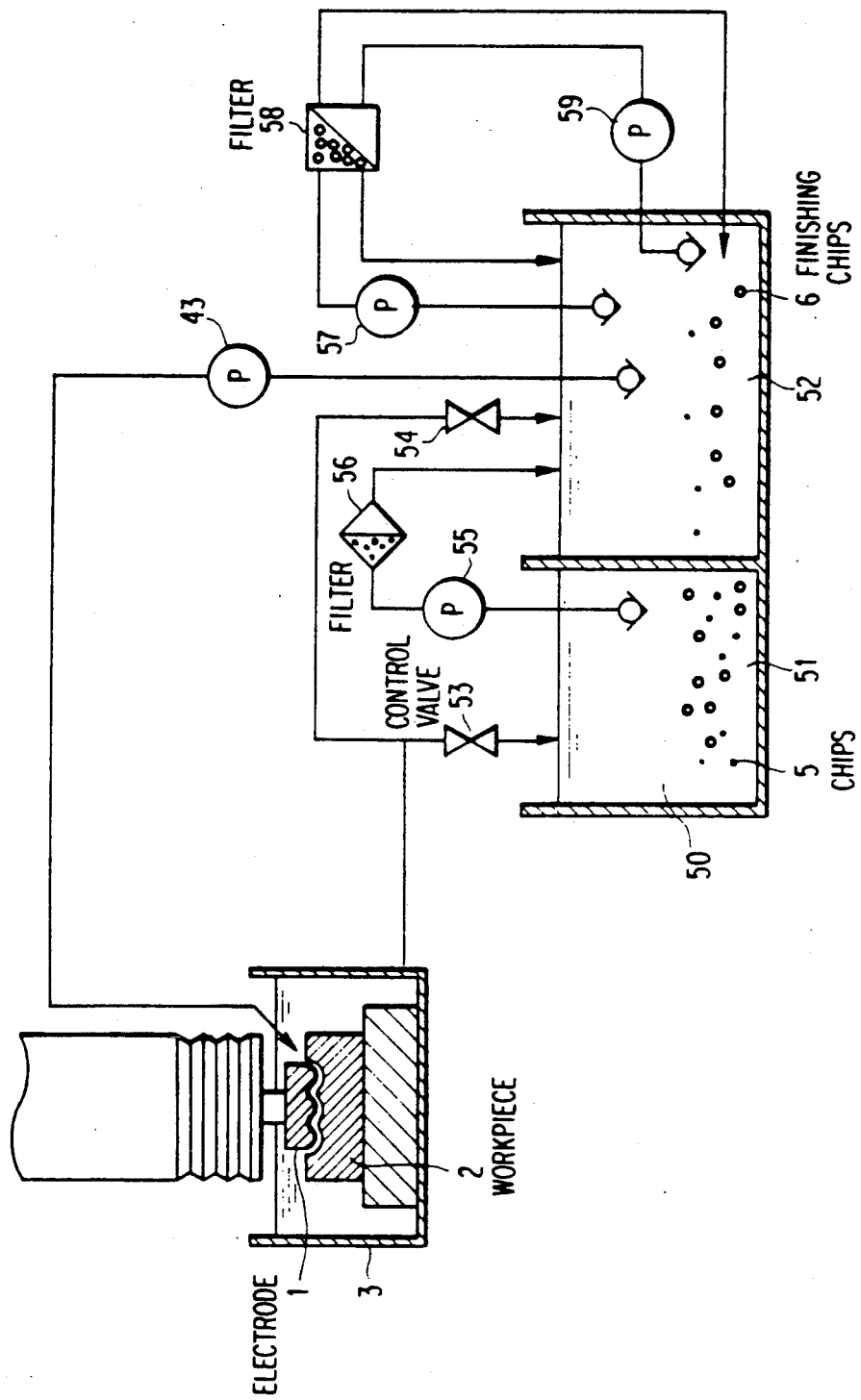
FIG. 13 illustrates a configuration of a dielectric treating apparatus according to a seventh embodiment of the present invention.
Figure 14:
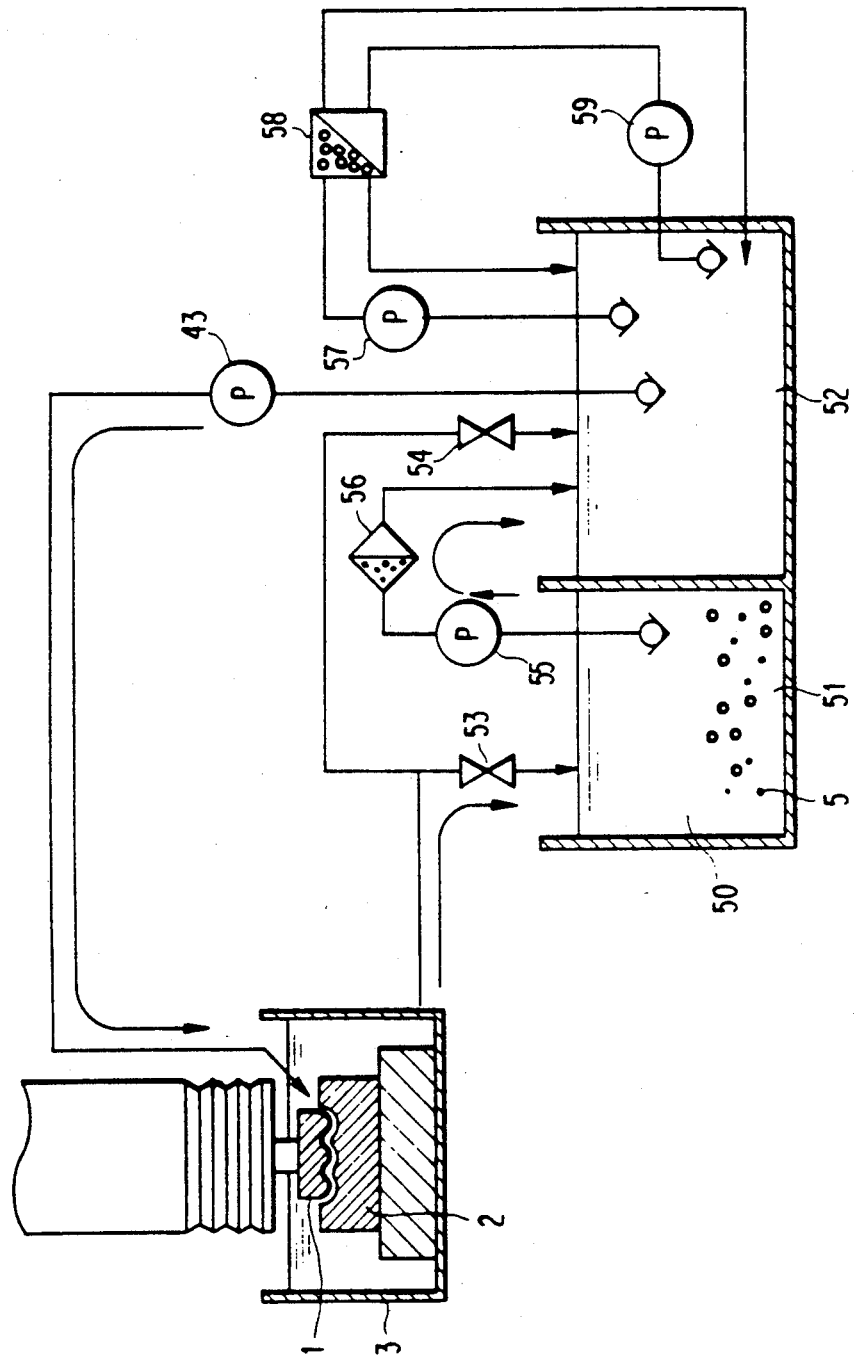
FIGS. 14 to 16 illustrate operations of the dielectric treating apparatus shown in FIG. 13.
Figure 15:
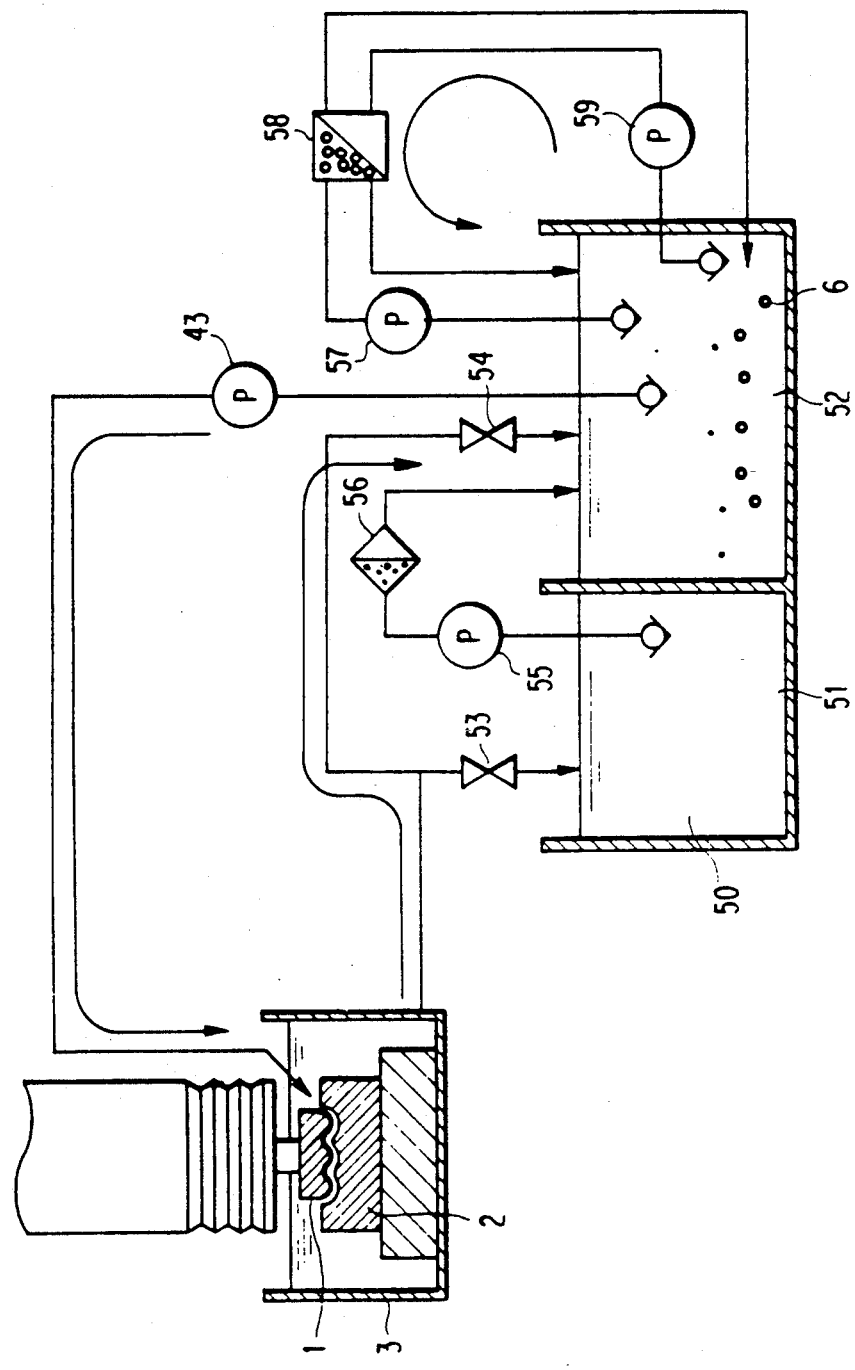
Figure 16:
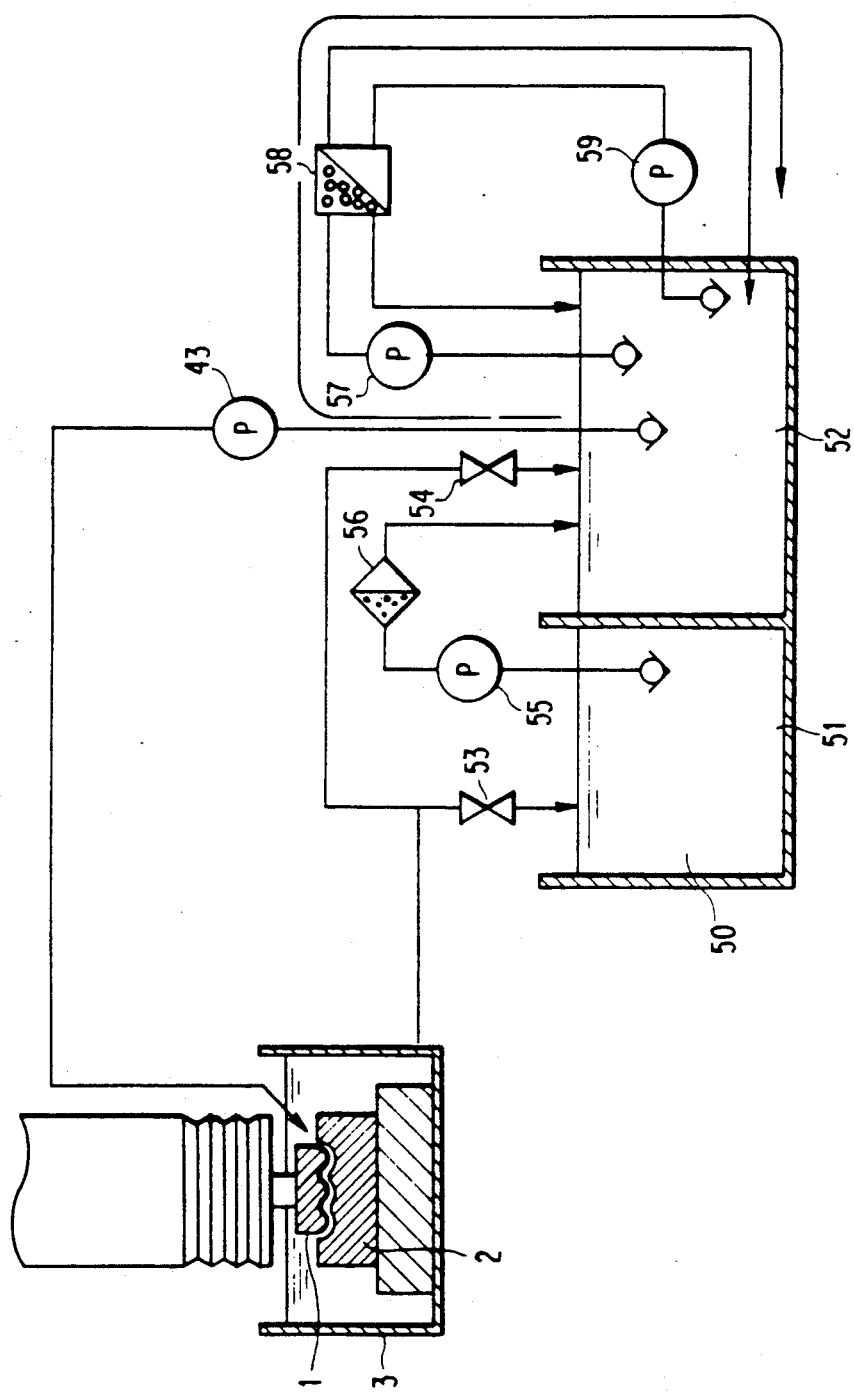

FIG. 13 illustrates the configuration of a seventh embodiment of the present invention, and FIGS. 14 to 16 illustrate the operation of the seventh embodiment in FIG. 13. The parts in these drawings identical or corresponding to those of the art in FIG. 23 are specified by the identical reference characters and will not be re-explained.

In FIG. 13 a dielectric container 50, e.g., a tank, has a dirty dielectric compartment 51 for containing dirty dielectric recovered from the EDMing tank 3, and a clean dielectric compartment 52 for containing clean dielectric obtained by filtering the dirty dielectric in the dirty dielectric compartment 51. Control valves 53 and 54 are employed to establish drain paths from tank 3 during roughing and finishing operations, respectively. The drain from the EDMing tank 3 is directed into the compartments 51 and 52, respectively. A pump 43 is connected between the dielectric tank 52 and the EDMing tank 3. A pump 55 is connected between compartments 51 and 52 and directs dielectric through filter 56 to filter out the roughing chips in the dirty dielectric. A pump 57 is employed to draw dielectric from compartment 52 through filter 58 in order to filter the powder materials 7 and provide clean dielectric to compartment 52 via a filter 58. A pump 59 is employed to backwash the powder materials 7 in filter 58 and provide clean dielectric from tank 52 so as to mix the powder materials 7 in the filter 58 into the clean dielectric tank 52 by flowing the dielectric in the opposite direction.

Operation of the seventh embodiment of the present invention will now be described with reference to the drawings. FIG. 14 illustrates the sequence of the dielectric flow during roughing. The dielectric in the clean dielectric compartment 52 of the roughing dielectric tank 50 is drawn by the pump 43 and introduced into the EDMing tank 3. The dielectric in the EDMing tank 3 is returned to the dirty dielectric compartment 51 by the control valve 53, then pump 55 directs the dirty dielectric with roughing chips 5 through the filter 56, and the clean dielectric is accumulated in the clean dielectric compartment 52. The roughing chips 5 are filtered off during roughing at all times or intermittently so that the clean dielectric, free of roughing chips 5, is supplied to the EDMing tank 3 during roughing.

The sequence of dielectric flow during finishing will now be described according to FIG. 15. Prior to the finishing operation, the pump 59 is operated to backwash the filter 58 and mix the powder materials 7 accumulated in the filter 58 into the clean dielectric compartment 52. The dielectric fully mixed with the powder materials 7 is drawn by the pump 43 and supplied to the EDMing tank 3 and the discharge gap. The dielectric used for finishing is recovered from the EDMing tank 3 to the clean dielectric compartment 52 via the drain control valve 54. After finishing, the pump 57 is operated as shown in FIG. 16 to have the powder materials 7 and the chips 6 in the clean dielectric compartment 52 removed by the filter 58, thereby cleaning the dielectric in the clean dielectric compartment 52. As previously noted, since the powder materials 7 have a relatively long life and a small amount of chips 6 are generated during finishing, the filter 58 may be changed and a predetermined amount of new powder materials 7 supplied every several hundred hours.

Figure 17:
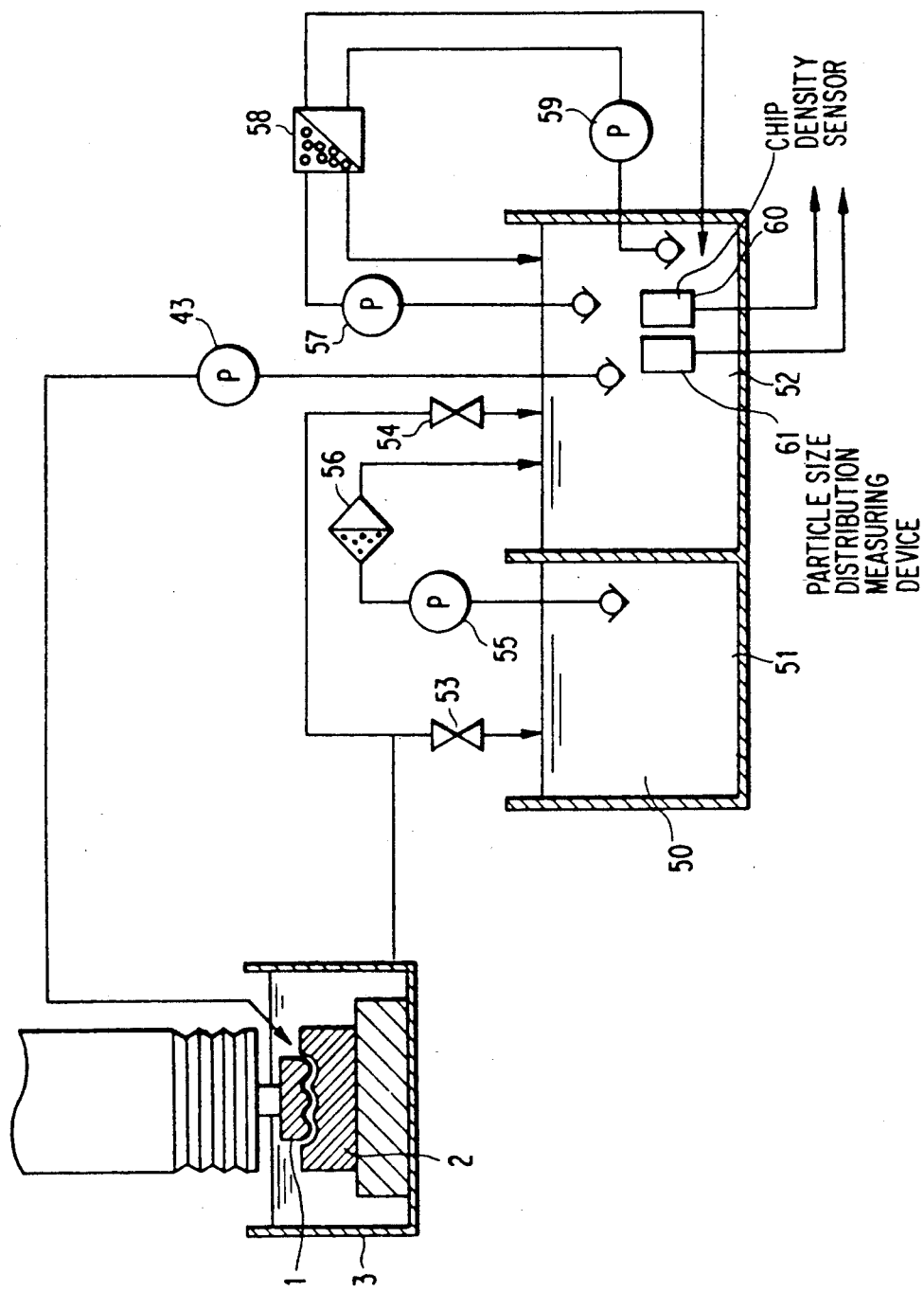
FIG. 17 illustrates a configuration of a dielectric treating apparatus according to an eighth embodiment of the present invention.

FIG. 17 illustrates the configuration of an eighth embodiment of the present invention which is provided with a chip density sensor 60 in the clean dielectric compartment 52 so as to identify when the chips 6 should be removed and the powder materials 7 changed. Further, since the deterioration degree of the powder materials 7 is indicated as a change in particle diameter of the powders, a powder particle diameter sensor, a particle size distribution measuring device 61 for optically measuring the powder contained per unit volume, or the like may be installed in the clean dielectric compartment 52 to identify when the powder materials should be changed.

Figure 18:
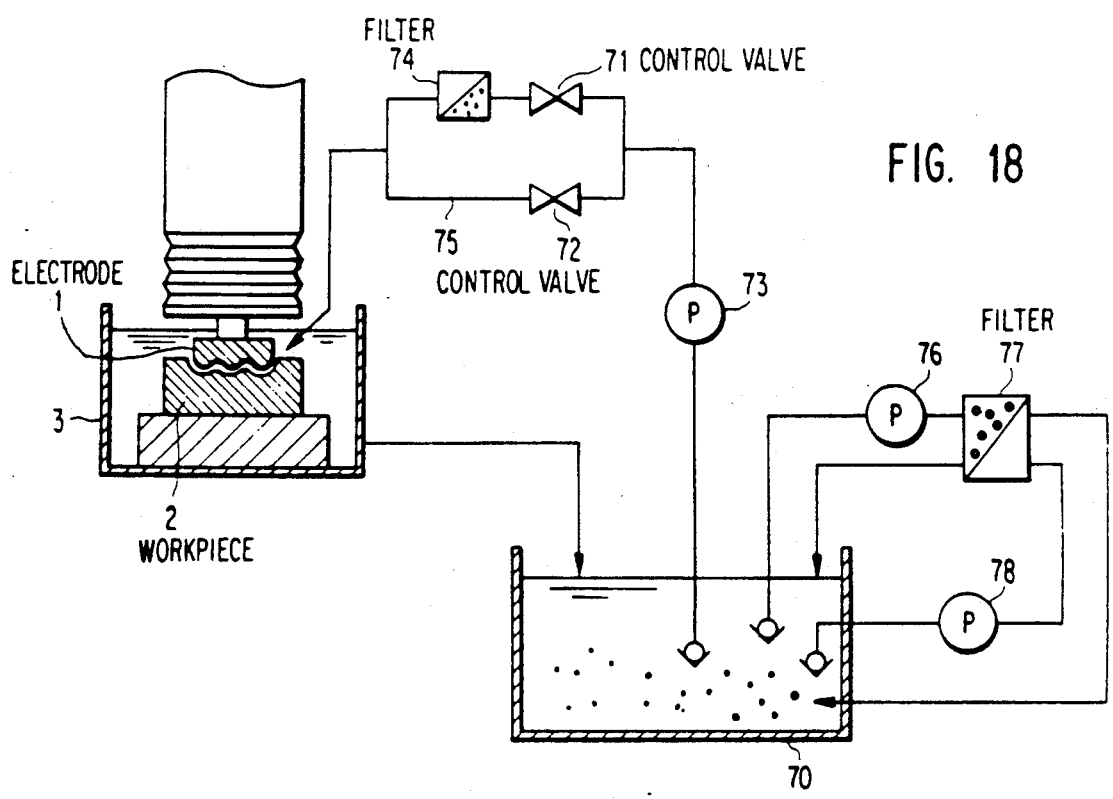
FIG. 18 illustrates a configuration of a dielectric treating apparatus according to a ninth embodiment of the present invention.
Figure 19:
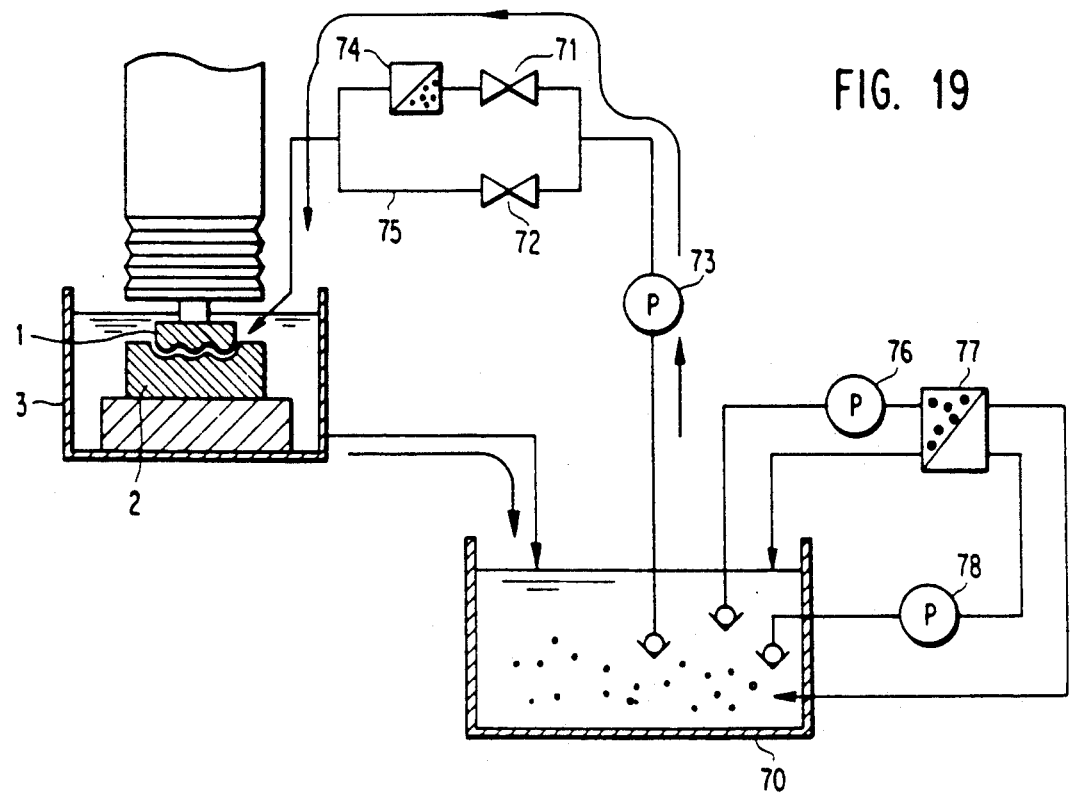
FIGS. 19 to 21 illustrate operations of the dielectric treating apparatus shown in FIG. 18.
Figure 20:
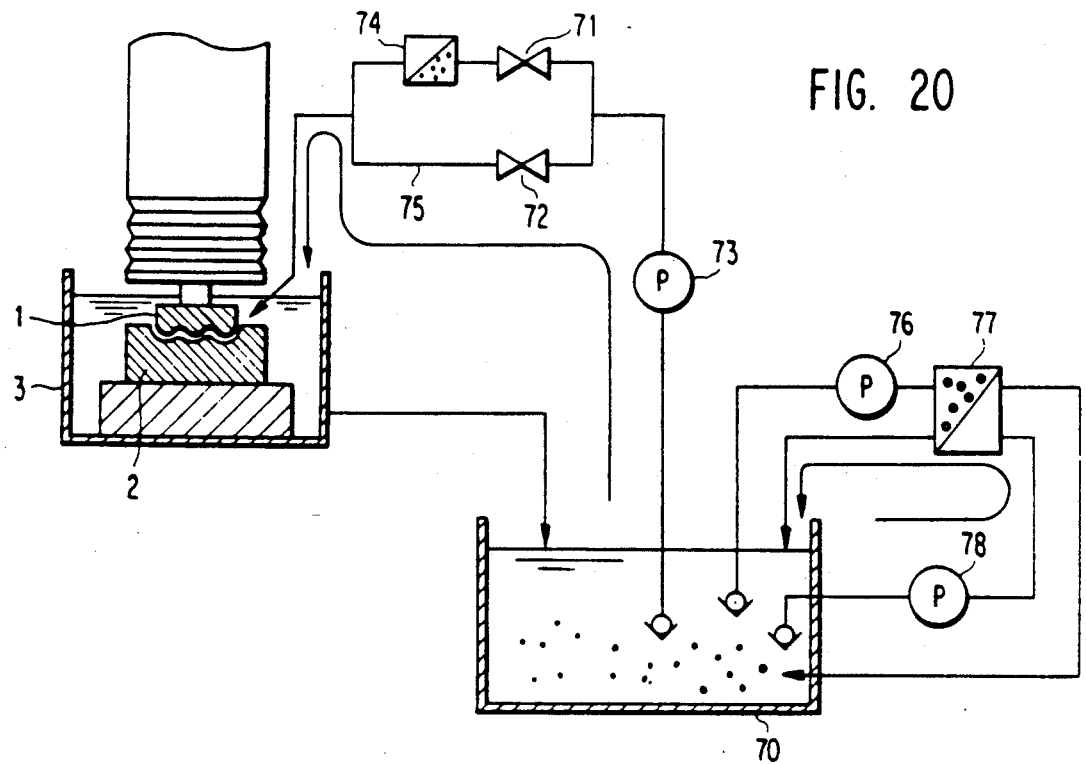
Figure 21:
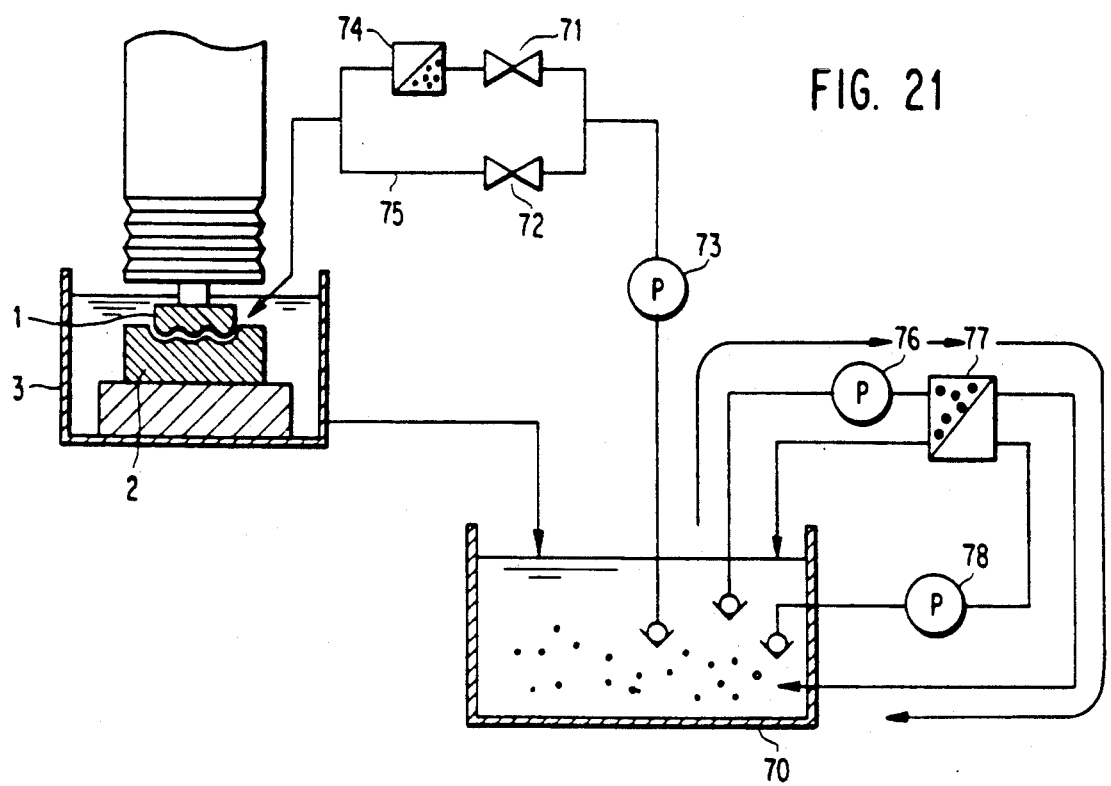

FIG. 18 illustrates the configuration of a ninth embodiment of the present invention, and FIGS. 19 to 21 illustrate the operation of this embodiment. Parts in these drawings identical or corresponding to those of the art in FIG. 23 are designated by the identical reference characters and will not be re-explained.

A dielectric container 70, e.g., a tank, and control valves 71 and 72 are employed to supply the dielectric during roughing and finishing operations, respectively. The dielectric from the dielectric tank 70 is delivered into the EDMing tank 3 directly. A pump 73 is employed to supply the dielectric and is connected between the dielectric tank 70 and the EDMing tank 3 via a filter 74 and a dielectric supply bypass 75. The control valves 71 and 72 function to switch between the filter 74 and the dielectric supply bypass 75. After a finishing operation, pump 76 is used to direct the dielectric with the powder materials 7 to a filter 77, where the powder is stored, and return clean dielectric to the dielectric tank 70 for use during a subsequent roughing operation, as described above. After a roughing operation, when another finishing operation is to be conducted, a pump 78 is employed to backwash the powder materials 7 with clean dielectric and provide finishing dielectric to tank 70. The powder materials 7 stored in the filter 77 are placed into the dielectric and stored in the dielectric tank 70 by flowing the dielectric in the opposite direction.

Operation of the ninth embodiment will now be described the reference to the drawings. FIG. 19 illustrates with sequence of dielectric flow during roughing. The dielectric in the dielectric tank 70 is delivered by the dielectric supplying pump 73 to the filter 74, then cleaned of roughing chips 5, and sent to the EDMing tank 3. The roughing chips 5 are filtered off at all times during roughing so that clean dielectric without roughing chips 5 is always supplied to the EDMing tank 3 and used for roughing.

The sequence of dielectric flow during finishing will now be described according to FIG. 20. Prior to finishing, the pump 78 is operated to backwash the filter 77 and mix the powder materials 7 accumulated in the filter 77 into the dielectric tank 70. The dielectric fully mixed with the powder materials 7 is drawn by the pump 73 and supplied to the EDMing tank 3 through the dielectric supply bypass 75 via the dielectric supplying control valve 72. Although the dielectric supplied during finishing is supplied to the EDMing tank 3 without being filtered, this poses no practical problem because the amount of chips generated during finishing is extremely small. After finishing, the pump 76 is operated as shown in FIG. 21 to have the powder materials 7 and the chips 6 in the dielectric tank 70 removed by the filter 77, whereby the dielectric in the dielectric tank 70 is cleaned. The filter 77 need only be changed, and the predetermined amount of new powder materials 7 supplied, every several hundred hours.

Figure 22:
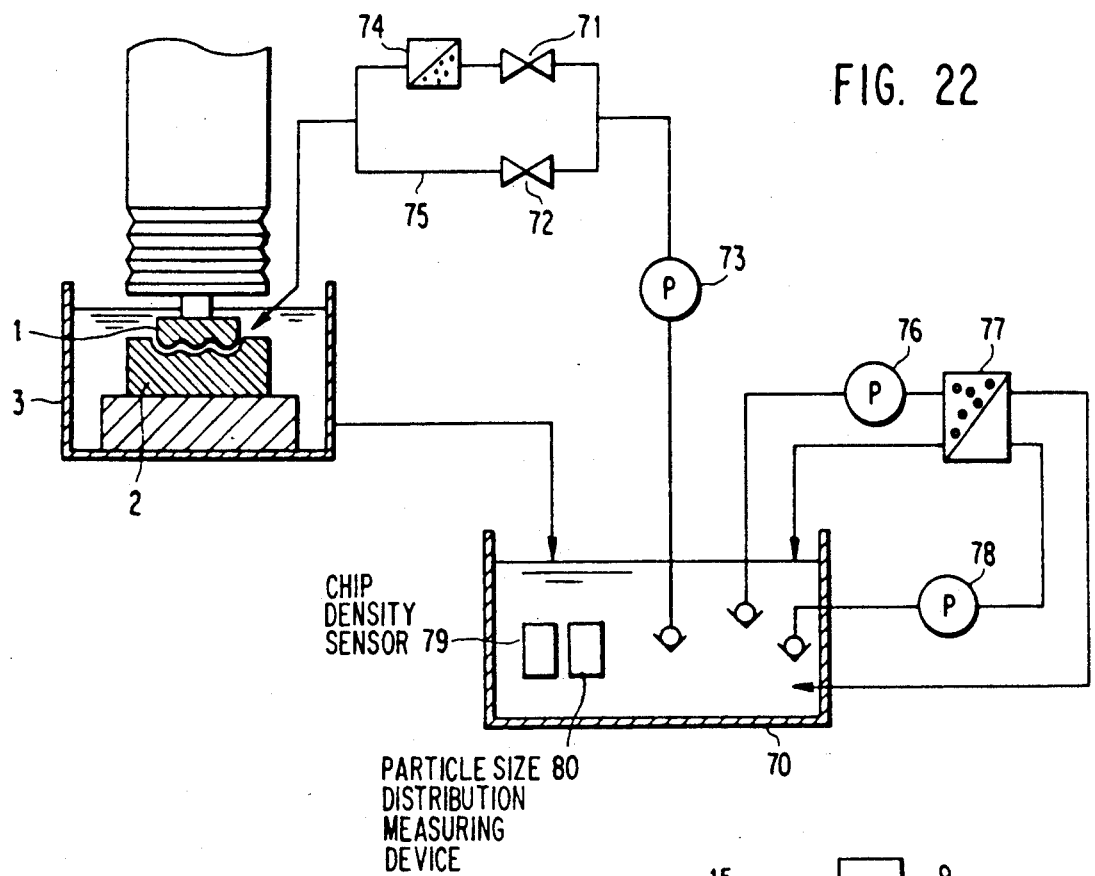
FIG. 22 illustrates a configuration of a dielectric treating apparatus according to a tenth embodiment of the present invention.

FIG. 22 illustrates the configuration of a tenth embodiment of the present invention which is provided with a chip density sensor 79 in the dielectric container, e.g., tank 70, so as to identify when the chips 6 should be removed and the powder materials 7 changed.

A particle size distribution measuring device 80 for optically measuring the powders contained per unit volume, or the like, may be installed in the dielectric tank 70 to identify when the powder materials 7 should be changed.

It will be apparent that the invention, as described above, achieves a dielectric treating apparatus which allows dielectric including powder materials to be used repeatedly for a long period of time, whereby high-priced powder materials can be employed efficiently and machining or surface treatment utilizing EDMing may be conducted economically.

Therefore, the present invention can present an economical EDM which is excellent in machining accuracy and characteristics and low in operating costs.

While the present invention has been described in connection with several preferred embodiments, it is not intended to be limited thereto and the full scope of the invention is to be defined by the appended claims.

What is claimed is:

1. An apparatus for treating dielectric for an electrical discharge machine, comprising:
    dielectric containing means for alternately containing a first dielectric and a second dielectric;
    path means establishing liquid communication between said dielectric containing means and an electrical discharge machine tank;
    control valves, operative within said path means for controlling the flow of said dielectrics;
    first dielectric filtering means disposed in said path means for filtering said first dielectric; and
    second dielectric filtering means for removing powder materials from said second dielectric;
    said dielectric containing means comprising a single noncompartmentalized tank having means for converting said first dielectric to said second dielectric by adding said powder materials to said first dielectric.

2. An apparatus for treating dielectric for an EDM which machines a workpiece, comprising:
    a single non-partitioned dielectric containing means for containing electric discharge machining dielectric;
    filtering means disposed in a liquid communication path connecting between said dielectric containing means and an electric discharge machining tank for filtering a first electric discharge machining dielectric when said workpiece is electric discharge machined with said first EDMing dielectric; and
    second dielectric filtering means for mixing powder materials into said first electric discharge machining dielectric to form a second dielectric, and for filtering said second EDMing dielectric after electric discharge machining with said second dielectric, to form said first dielectric.

3. The apparatus of any one of claims 1 and 2 further comprising:
    means for detecting the deterioration of said powder material 4. The apparatus of claim 3, wherein said means for detecting comprises means for measuring the size of particles in the dielectric.

5. The apparatus of claim 4, further comprising means responsive to said detecting means for controlling at least one of the filtering of particles form said second dielectric and the generation of second dielectric with new powder material.

6. The apparatus of claim 3, wherein aid means for detecting comprises means for identifying the number of particles per unit volume for dielectric.

7. The apparatus of claim 6, further comprising means responsive to said detecting means for controlling at least one of the filtering of particles form said second dielectric and the generation of second dielectric with new powder material.

8. The apparatus of any one of claims 1 and 2, wherein said second dielectric filtering means comprises bidirectional filter means operative in response to dielectric flow in a first direction to filter particulate material from said dielectric, and operative in response to dielectric flow in a second direction, opposite to said first direction, to return previously filtered particulate material to said dielectric.

9. The apparatus of claim 8 further comprising means for detecting the deterioration of said powder material.

10. The apparatus of claim 9, wherein said means for detecting comprises at least one of means for measuring the size of particles in the dielectric and means for identifying the number of particles per unit volume of dielectric.

11. A method of treating the dielectric of an EDM which machines a workpiece positioned within an electrical discharge machining tank and proximate to an electrode with a discharge ga formed between said electrode and said workpiece, said gap being supplied selectively with a first dielectric during an EDM roughing operation and a second dielectric during an EDM finishing operation, said second dielectric comprising said first dielectric combined with at least finishing powder materials, comprising:
    filtering said second dielectric to remove and store said finishing powder materials by passing said second dielectric in a first direction through a bidirectional filter; and mixing said finishing powder materials into said first dielectric by passing said first dielectric through said filter in a second direction, opposite to said first direction.

12. A method of treating the dielectric used in an electrical discharge machine, comprising:

during an electrical discharge machine roughing operation, filtering a first dielectric to remove roughing contaminants therefrom and storing said filtered first dielectric in a single non-partitioned tank for one of further use in the roughing operation and subsequent use in a finishing operation;

generating a second dielectric by at least mixing said stored and filtered first dielectric with a powder material in said tank; and periodically filtering said second dielectric for one of (a) further use in the finishing operation by the removal of deteriorated powder materials and the replacement thereof with new powder materials and (b) use in a subsequent roughing operation as said first dielectric.

13. The method of claim 12, further comprising the step of detecting the deterioration of said powder materials and controlling said second dielectric filtering step in response thereto.

14. The method of claim 13, wherein said detecting step comprises at least one of detecting the size of the particles comprising said powder materials and detecting the density of particles comprising said powder in a given volume of dielectric.

15. The method of claim 13, wherein said controlling step is automatic.

16. A method of machining workpiece using an electrical discharge machining apparatus (EDM), comprising the steps of:

(a) supplying a first dielectric to a gap formed between a workpiece and an electrode of said electrical discharge machine during a first stage of machining and storing said first dielectric in a single non-partitioned tank;

(b) filtering said first dielectric to remove first stage machining by-products therefrom and storing said first dielectric in said tank;

(c) supplying a second dielectric, stored in said tank, to said gap during a second stage of machining; said second dielectric containing a quantity of powder material;

(d) controlling the flow of said first and second dielectrics to and from said gap so as to prevent contamination of said powder material by quantities of said first stage machining by-products.

17. A method as claimed in claim 16, wherein said second dielectric is created by adding said powder material to said first dielectric after completion of said filtering step, but before said second stage of machining, and wherein said first dielectric is reconstituted from said second dielectric by filtering said powder material from said second dielectric, prior to a subsequent first stage of machining.

18. An apparatus for treating dielectric for an electrical discharge machine which machines a workpiece, comprising:

a single non-compartmentalized dielectric containing means for alternately containing a first dielectric and a second dielectric;

path means connecting between said dielectric containing means and an electrical discharge machine tank;

control valve means disposed in said path means for controlling the flow of dielectric;

first dielectric filtering means in liquid communication with said dielectric containing means for filtering said first dielectric; and second dielectric filtering means in liquid communication with said dielectric containing means and operative to mix powder materials into said first dielectric to form said second dielectric at the start of an electrical discharge machine operation with said second dielectric and to filter said second dielectric to form said first dielectric after an electrical discharge machine operation with said second dielectric.

* * * * *